(12) United States Patent
Hazzard et al.

(10) Patent No.: US 11,073,281 B2
(45) Date of Patent: Jul. 27, 2021

(54) CLOSED-LOOP PROGRAMMING AND CONTROL OF A COMBUSTION APPLIANCE

(71) Applicant: Honeywell International Inc., Morris Plains, NJ (US)

(72) Inventors: Frederick Hazzard, Ham Lake, MN (US); Glenn Bergum, St. Anthony Village, MN (US); Bernard Graham, Maple Grove, MN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 302 days.

(21) Appl. No.: 16/032,435

(22) Filed: Jul. 11, 2018

(65) Prior Publication Data

US 2019/0203936 A1    Jul. 4, 2019

Related U.S. Application Data

(60) Provisional application No. 62/612,250, filed on Dec. 29, 2017.

(51) Int. Cl.
*F23N 5/00* (2006.01)
*F23N 1/02* (2006.01)
(Continued)

(52) U.S. Cl.
CPC ............. *F23N 5/006* (2013.01); *F23N 1/022* (2013.01); *F23N 5/242* (2013.01);
(Continued)

(58) Field of Classification Search
CPC .. G05B 2219/2649; G05B 2219/45006; G05B 19/0426; F23N 2235/12;
(Continued)

(56) References Cited

U.S. PATENT DOCUMENTS

| 156,769 A | 11/1874 | Cameron |
| 424,581 A | 4/1890 | Sickels |

(Continued)

FOREIGN PATENT DOCUMENTS

| DE | 3638604 A1 | 5/1988 |
| DE | 3818363 A1 | 4/1989 |

(Continued)

OTHER PUBLICATIONS

Allianz Risk Consulting, "Safety Shutoff Valves for Fuel-Fired Heating Equipment," Tech Talk, vol. 1, 3 pages, Oct. 2012.

(Continued)

*Primary Examiner* — Shogo Sasaki
(74) *Attorney, Agent, or Firm* — Seager, Tufte & Wickhem, LLP

(57) ABSTRACT

Methods and systems for programming and controlling a control system of a gas valve assembly. The methods and systems include programming a control system in an automated manner to establish an air-fuel ratio based at least in part on a burner firing rate. The established air-fuel ratio may be configured to facilitate meeting a combustion constituent set point of combustion constituents in the combustion exhaust. The methods and systems include controlling operation of a combustion appliance based on closed-loop control techniques and utilizing feedback from a sensor measuring combustion constituents in exhaust from a combustion chamber in the combustion appliance. The combustion constituents on which control of the combustion appliance may be determined include oxygen and/or carbon dioxide.

5 Claims, 14 Drawing Sheets

(51) Int. Cl.
   *F23N 5/24* (2006.01)
   *G05B 19/042* (2006.01)
(52) U.S. Cl.
   CPC ...... *G05B 19/0426* (2013.01); *F23N 2223/04* (2020.01); *F23N 2223/08* (2020.01); *F23N 2235/00* (2020.01); *F23N 2235/06* (2020.01); *F23N 2235/12* (2020.01); *F23N 2235/18* (2020.01); *F23N 2241/02* (2020.01); *F23N 2241/04* (2020.01); *F23N 2241/08* (2020.01); *F23N 2900/05002* (2013.01); *G05B 2219/2649* (2013.01)
(58) Field of Classification Search
   CPC ............. F23N 2235/06; F23N 2241/04; F23N 2241/02; F23N 5/242; F23N 2223/04; F23N 5/006; F23N 2235/00; F23N 2900/05002; F23N 2223/08; F23N 2235/18; F23N 2241/08; F23N 1/022
   See application file for complete search history.

(56) References Cited

U.S. PATENT DOCUMENTS

| | | |
|---|---|---|
| 1,033,204 A | 7/1912 | Skinner |
| 1,147,840 A | 7/1915 | Bowser |
| 1,156,977 A | 10/1915 | Cloos |
| 1,165,315 A | 12/1915 | Cameron |
| 1,206,532 A | 11/1916 | Gray |
| 1,847,385 A | 3/1932 | Dengler |
| 2,093,122 A | 9/1937 | Andrews |
| 2,196,798 A | 4/1940 | Horstmann |
| 2,403,692 A | 7/1946 | Tibbetts |
| 2,440,329 A | 4/1948 | Doble |
| 2,497,549 A | 2/1950 | Heller |
| 2,561,793 A | 7/1951 | Furczyk |
| 2,791,238 A | 5/1957 | Bryant |
| 2,975,307 A | 3/1961 | Schroeder et al. |
| 3,164,364 A | 1/1965 | McColl |
| 3,202,170 A | 8/1965 | Holbrook |
| 3,304,406 A | 2/1967 | King |
| 3,346,008 A | 10/1967 | Scaramucci |
| 3,381,623 A | 5/1968 | Elliott |
| 3,393,965 A | 7/1968 | Vaughan |
| 3,414,010 A | 12/1968 | Sparrow |
| 3,493,005 A | 2/1970 | Kakegawa |
| 3,641,373 A | 2/1972 | Elkuch |
| 3,646,969 A | 3/1972 | Stampfli |
| 3,744,754 A | 7/1973 | Demi |
| 3,768,955 A | 10/1973 | McLaughlin |
| 3,769,531 A | 10/1973 | Elkuch |
| 3,803,424 A | 4/1974 | Smiley et al. |
| 3,884,266 A | 5/1975 | Kondo |
| 3,947,644 A | 3/1976 | Uchikawa |
| 3,960,364 A | 6/1976 | Hargrave |
| 3,973,576 A | 8/1976 | Dietiker et al. |
| 3,973,976 A | 8/1976 | Boyd |
| 3,993,939 A | 11/1976 | Slavin et al. |
| 4,114,652 A | 9/1978 | Oberle |
| 4,115,036 A | 9/1978 | Paterson |
| 4,140,936 A | 2/1979 | Bullock |
| 4,188,013 A | 2/1980 | Battersby et al. |
| 4,188,972 A | 2/1980 | Van Der Zee |
| 4,197,737 A | 4/1980 | Pittman |
| 4,242,080 A | 12/1980 | Tabei |
| 4,277,832 A | 7/1981 | Wong |
| 4,360,955 A | 11/1982 | Block |
| 4,402,340 A | 9/1983 | Lockwood, Jr. |
| 4,406,131 A | 9/1983 | Weasel, Jr. |
| 4,418,886 A | 12/1983 | Holzer |
| 4,442,853 A | 4/1984 | Gort |
| 4,450,868 A | 5/1984 | Duval et al. |
| 4,453,169 A | 6/1984 | Martner |
| 4,478,076 A | 10/1984 | Bohrer |
| 4,478,077 A | 10/1984 | Bohrer et al. |
| 4,481,776 A | 11/1984 | Araki et al. |
| 4,493,303 A | 1/1985 | Thompson et al. |
| 4,498,850 A | 2/1985 | Perlov et al. |
| 4,498,863 A | 2/1985 | Hanson et al. |
| 4,501,144 A | 2/1985 | Higashi et al. |
| 4,539,575 A | 9/1985 | Nilsson |
| 4,543,974 A | 10/1985 | Dietiker et al. |
| 4,576,050 A | 3/1986 | Lambert |
| 4,581,624 A | 4/1986 | O'Connor |
| 4,581,707 A | 4/1986 | Millar |
| 4,585,209 A | 4/1986 | Aine et al. |
| 4,619,438 A | 10/1986 | Coffee |
| 4,622,699 A | 11/1986 | Spriggs |
| 4,622,999 A | 11/1986 | Ray |
| 4,628,499 A | 12/1986 | Hammett |
| 4,645,450 A | 2/1987 | West |
| 4,651,564 A | 3/1987 | Johnson et al. |
| 4,654,546 A | 3/1987 | Kirjavainen |
| 4,698,015 A | 10/1987 | Brunel |
| 4,722,360 A | 2/1988 | Odajima et al. |
| 4,756,508 A | 7/1988 | Giachino et al. |
| 4,798,531 A | 1/1989 | Breckner |
| 4,815,699 A | 3/1989 | Mueller |
| 4,821,999 A | 4/1989 | Ohtaka |
| 4,829,826 A | 5/1989 | Valentin et al. |
| 4,835,717 A | 5/1989 | Michel et al. |
| 4,836,247 A | 6/1989 | Chuang |
| 4,898,200 A | 2/1990 | Odajima et al. |
| 4,911,616 A | 3/1990 | Laumann, Jr. |
| 4,915,613 A | 4/1990 | Landis |
| 4,938,742 A | 7/1990 | Smits |
| 4,939,405 A | 7/1990 | Okuyama et al. |
| 5,022,435 A | 6/1991 | Jaw-Shiunn |
| 5,024,265 A | 6/1991 | Buchholz et al. |
| 5,057,822 A | 10/1991 | Hoffman |
| 5,065,978 A | 11/1991 | Albarda et al. |
| 5,069,419 A | 12/1991 | Jerman |
| 5,070,252 A | 12/1991 | Castenschiold et al. |
| 5,078,581 A | 1/1992 | Blum et al. |
| 5,082,242 A | 1/1992 | Bonne et al. |
| 5,082,246 A | 1/1992 | Stanley et al. |
| 5,085,562 A | 2/1992 | Van Lintel |
| 5,096,388 A | 3/1992 | Weinberg |
| 5,129,794 A | 7/1992 | Beattty |
| 5,146,941 A | 9/1992 | Statler |
| 5,148,074 A | 9/1992 | Fujita et al. |
| 5,169,063 A | 12/1992 | Miyazaki et al. |
| 5,171,132 A | 12/1992 | Miyazaki et al. |
| 5,176,358 A | 1/1993 | Bonne et al. |
| 5,180,288 A | 1/1993 | Richter et al. |
| 5,180,623 A | 1/1993 | Ohnstein |
| 5,186,054 A | 2/1993 | Sekimura |
| 5,190,068 A | 3/1993 | Philbin |
| 5,192,197 A | 3/1993 | Culp |
| 5,193,993 A | 3/1993 | Dietiker |
| 5,199,456 A | 4/1993 | Love et al. |
| 5,199,462 A | 4/1993 | Baker |
| 5,203,688 A | 4/1993 | Dietiker |
| 5,205,323 A | 4/1993 | Baker |
| 5,206,557 A | 4/1993 | Bobbio |
| 5,215,112 A | 6/1993 | Davison |
| 5,215,115 A | 6/1993 | Dietiker |
| 5,219,278 A | 6/1993 | van Lintel |
| 5,224,843 A | 7/1993 | van Lintel |
| 5,244,527 A | 9/1993 | Aoyagi |
| 5,244,537 A | 9/1993 | Ohnstein |
| 5,263,514 A | 11/1993 | Reeves |
| 5,294,089 A | 3/1994 | LaMarca |
| 5,317,670 A | 5/1994 | Elia |
| 5,322,258 A | 6/1994 | Bosch et al. |
| 5,323,999 A | 6/1994 | Bonne |
| 5,325,880 A | 7/1994 | Johnson et al. |
| 5,336,062 A | 8/1994 | Richter |
| 5,368,571 A | 11/1994 | Horres, Jr. |
| 5,388,607 A | 2/1995 | Ramaker et al. |
| 5,441,597 A | 8/1995 | Bonne et al. |
| 5,449,142 A | 9/1995 | Banick |
| 5,452,878 A | 9/1995 | Gravesen et al. |
| 5,460,196 A | 10/1995 | Yonnet |

(56) References Cited

U.S. PATENT DOCUMENTS

| | | |
|---|---|---|
| 5,477,877 A | 12/1995 | Schulze et al. |
| 5,499,909 A | 3/1996 | Yamada et al. |
| 5,513,611 A | 5/1996 | Ricouard et al. |
| 5,520,533 A | 5/1996 | Vrolijk |
| 5,526,172 A | 6/1996 | Kanack |
| 5,529,465 A | 6/1996 | Zengerle et al. |
| 5,536,963 A | 7/1996 | Polla |
| 5,538,220 A | 7/1996 | LaMarca |
| 5,541,465 A | 7/1996 | Higuchi et al. |
| 5,552,654 A | 9/1996 | Konno et al. |
| 5,565,832 A | 10/1996 | Haller et al. |
| 5,571,401 A | 11/1996 | Lewis et al. |
| 5,580,444 A | 12/1996 | Burrows |
| 5,590,235 A | 12/1996 | Rappenecker et al. |
| 5,621,164 A | 4/1997 | Woodbury et al. |
| 5,642,015 A | 6/1997 | Whitehead et al. |
| 5,662,465 A | 9/1997 | Kano |
| 5,676,342 A | 10/1997 | Otto et al. |
| 5,683,159 A | 11/1997 | Johnson |
| 5,685,707 A | 11/1997 | Ramsdell et al. |
| 5,696,662 A | 12/1997 | Bauhahn |
| 5,725,363 A | 3/1998 | Bustgens et al. |
| 5,735,503 A | 4/1998 | Hietkamp |
| 5,741,978 A | 4/1998 | Gudmundsson |
| 5,748,432 A | 5/1998 | Przywozny et al. |
| 5,755,259 A | 5/1998 | Schulze et al. |
| 5,759,014 A | 6/1998 | Van Lintel |
| 5,759,015 A | 6/1998 | Van Lintel et al. |
| 5,769,043 A | 6/1998 | Nitikiewicz |
| 5,774,372 A | 6/1998 | Berwanger |
| 5,790,420 A | 8/1998 | Lang |
| 5,792,957 A | 8/1998 | Luder et al. |
| 5,797,358 A | 8/1998 | Brandt et al. |
| 5,808,205 A | 9/1998 | Romo |
| 5,822,170 A | 10/1998 | Cabuz et al. |
| 5,827,950 A | 10/1998 | Woodbury et al. |
| 5,836,750 A | 11/1998 | Cabuz |
| 5,839,467 A | 11/1998 | Saaski et al. |
| 5,847,523 A | 12/1998 | Rappenecker et al. |
| 5,863,708 A | 1/1999 | Zanzucchi et al. |
| 5,887,847 A | 3/1999 | Holborow |
| 5,893,389 A | 4/1999 | Cunningham |
| 5,901,939 A | 5/1999 | Cabuz et al. |
| 5,911,872 A | 6/1999 | Lewis et al. |
| 5,918,852 A | 7/1999 | Otto |
| 5,933,573 A | 8/1999 | Lukenich et al. |
| 5,944,257 A | 8/1999 | Dietiker et al. |
| 5,954,079 A | 9/1999 | Barth et al. |
| 5,954,089 A | 9/1999 | Seymour |
| 5,957,158 A | 9/1999 | Volz et al. |
| 5,959,448 A | 9/1999 | Baranski et al. |
| 5,967,124 A | 10/1999 | Cook et al. |
| 5,971,355 A | 10/1999 | Biegelsen et al. |
| 5,971,746 A | 10/1999 | Givens et al. |
| 5,982,274 A | 11/1999 | Stelter et al. |
| 5,986,573 A | 11/1999 | Franklin et al. |
| 5,997,280 A | 12/1999 | Welz, Jr. et al. |
| 6,003,552 A | 12/1999 | Shank et al. |
| 6,021,652 A | 2/2000 | Walker |
| 6,050,281 A | 4/2000 | Adams et al. |
| 6,057,771 A | 5/2000 | Lakra |
| 6,077,068 A | 6/2000 | Okumura |
| 6,106,245 A | 8/2000 | Cabuz |
| 6,109,889 A | 8/2000 | Zengerle et al. |
| 6,116,863 A | 9/2000 | Ahn et al. |
| 6,122,973 A | 9/2000 | Nomura et al. |
| 6,151,967 A | 11/2000 | McIntosh et al. |
| 6,152,168 A | 11/2000 | Ohmi et al. |
| 6,155,531 A | 12/2000 | Holborow et al. |
| 6,167,761 B1 | 1/2001 | Hanzawa et al. |
| 6,176,247 B1 | 1/2001 | Winchcomb et al. |
| 6,179,000 B1 | 1/2001 | Zdobinski et al. |
| 6,179,586 B1 | 1/2001 | Herb et al. |
| 6,182,941 B1 | 2/2001 | Scheurenbrand et al. |
| 6,184,607 B1 | 2/2001 | Cabuz et al. |
| 6,189,568 B1 | 2/2001 | Bergum et al. |
| 6,215,221 B1 | 4/2001 | Cabuz et al. |
| 6,240,944 B1 | 6/2001 | Ohnstein et al. |
| 6,242,909 B1 | 6/2001 | Dorsey et al. |
| 6,247,919 B1 | 6/2001 | Welz, Jr. et al. |
| 6,255,609 B1 | 7/2001 | Samuelson et al. |
| 6,263,908 B1 | 7/2001 | Love et al. |
| 6,288,472 B1 | 9/2001 | Cabuz et al. |
| 6,297,640 B1 | 10/2001 | Hayes |
| 6,321,781 B1 | 11/2001 | Kurth |
| 6,360,773 B1 | 3/2002 | Rhodes |
| 6,373,682 B1 | 4/2002 | Goodwin-Johansson |
| 6,386,234 B2 | 5/2002 | Sontag |
| 6,390,027 B1 | 5/2002 | Lyons et al. |
| 6,397,798 B1 | 6/2002 | Fiaccabrino |
| 6,401,753 B2 | 6/2002 | Neu |
| 6,418,793 B1 | 7/2002 | Pechoux et al. |
| 6,445,053 B1 | 9/2002 | Cho |
| 6,450,200 B1 | 9/2002 | Ollivier |
| 6,460,567 B1 | 10/2002 | Hansen, III et al. |
| 6,463,546 B1 | 10/2002 | Jeske et al. |
| 6,496,348 B2 | 12/2002 | McIntosh |
| 6,496,786 B1 | 12/2002 | Dieterle et al. |
| 6,505,838 B1 | 1/2003 | Cavaliere |
| 6,508,528 B2 | 1/2003 | Fujii et al. |
| 6,520,753 B1 | 2/2003 | Grosjean et al. |
| 6,533,574 B1 | 3/2003 | Pechoux |
| 6,536,287 B2 | 3/2003 | Beekhuizen et al. |
| 6,537,060 B2 | 3/2003 | Vegter |
| 6,547,554 B2 | 4/2003 | Koegl et al. |
| 6,550,495 B1 | 4/2003 | Schulze |
| 6,553,979 B2 | 4/2003 | Albright |
| 6,561,791 B1 | 5/2003 | Vrolijk et al. |
| 6,563,233 B1 | 5/2003 | Hinks |
| 6,564,824 B2 | 5/2003 | Lowery et al. |
| 6,571,817 B1 | 6/2003 | Bohan, Jr. |
| 6,572,077 B1 | 6/2003 | Worner |
| 6,579,087 B1 | 6/2003 | Vrolijk |
| 6,584,852 B2 | 7/2003 | Suzuki et al. |
| 6,590,267 B1 | 7/2003 | Goodwin-Johansson et al. |
| 6,606,911 B2 | 8/2003 | Akiyama et al. |
| 6,619,388 B2 | 9/2003 | Dietz et al. |
| 6,619,612 B2 | 9/2003 | Freisinger et al. |
| 6,623,012 B1 | 9/2003 | Perry et al. |
| 6,640,642 B1 | 11/2003 | Onose et al. |
| 6,644,351 B2 | 11/2003 | La Marca et al. |
| 6,650,211 B2 | 11/2003 | Pimouguet |
| 6,651,506 B2 | 11/2003 | Lee et al. |
| 6,651,636 B1 | 11/2003 | Albright |
| 6,651,954 B1 | 11/2003 | Porcher et al. |
| 6,655,409 B1 | 12/2003 | Steenburgh et al. |
| 6,655,652 B2 | 12/2003 | Meinhof |
| 6,658,928 B1 | 12/2003 | Pollack et al. |
| 6,676,580 B2 | 1/2004 | Tsai et al. |
| 6,704,186 B2 | 3/2004 | Ishikura |
| 6,725,167 B2 | 4/2004 | Grumstrup et al. |
| 6,728,600 B1 | 4/2004 | Contaldo et al. |
| 6,729,601 B2 | 5/2004 | Freisinger et al. |
| 6,742,541 B2 | 6/2004 | Pimouguet |
| 6,768,406 B1 | 7/2004 | Fiaccabrino |
| 6,796,326 B2 | 9/2004 | Bayer |
| 6,813,954 B2 | 11/2004 | Gokhfeld |
| 6,814,102 B2 | 11/2004 | Hess et al. |
| 6,814,339 B2 | 11/2004 | Berger et al. |
| 6,819,208 B1 | 11/2004 | Peghaire et al. |
| 6,820,650 B2 | 11/2004 | Solet et al. |
| 6,825,632 B2 | 11/2004 | Hahn et al. |
| 6,826,947 B2 | 12/2004 | Solet et al. |
| 6,851,298 B2 | 2/2005 | Miura et al. |
| 6,874,367 B2 | 4/2005 | Jakobsen |
| 6,877,380 B2 | 4/2005 | Lewis |
| 6,877,383 B2 | 4/2005 | Horie et al. |
| 6,880,548 B2 | 4/2005 | Schultz et al. |
| 6,880,567 B2 | 4/2005 | Klaver et al. |
| 6,885,184 B1 | 4/2005 | Gofman |
| 6,888,354 B1 | 5/2005 | Gofman |
| 6,889,705 B2 | 5/2005 | Newman et al. |
| 6,892,756 B2 | 5/2005 | Schulze |
| 6,903,526 B2 | 6/2005 | Weisser et al. |

(56) References Cited

U.S. PATENT DOCUMENTS

| | | |
|---|---|---|
| 6,906,484 B1 | 6/2005 | Berroth et al. |
| 6,923,069 B1 | 8/2005 | Stewart |
| 6,949,903 B2 | 9/2005 | Berroth et al. |
| 6,956,340 B2 | 10/2005 | Schondelmaier et al. |
| 6,956,343 B2 | 10/2005 | Berroth et al. |
| 6,968,851 B2 | 11/2005 | Ramirez et al. |
| 6,981,426 B2 | 1/2006 | Wang et al. |
| 6,983,759 B2 | 1/2006 | Maichel et al. |
| 6,984,122 B2 | 1/2006 | Sullivan et al. |
| 6,994,308 B1 | 2/2006 | Wang et al. |
| 6,997,684 B2 | 2/2006 | Hahn et al. |
| 7,000,635 B2 | 2/2006 | Erbe et al. |
| 7,004,034 B2 | 2/2006 | Chen |
| 7,036,791 B2 | 5/2006 | Wiese |
| 7,039,502 B2 | 5/2006 | Berwanger et al. |
| 7,066,203 B2 | 6/2006 | Baarda |
| 7,082,835 B2 | 8/2006 | Cook et al. |
| 7,089,086 B2 | 8/2006 | Schoonover |
| 7,089,959 B2 | 8/2006 | Cai |
| 7,093,611 B2 | 8/2006 | Murray et al. |
| 7,101,172 B2 | 9/2006 | Jaeschke |
| 7,107,820 B2 | 9/2006 | Nunnally et al. |
| 7,119,504 B2 | 10/2006 | Dornhof |
| 7,121,525 B2 | 10/2006 | Gelez |
| 7,174,771 B2 | 2/2007 | Cooper |
| 7,216,547 B1 | 5/2007 | Stewart et al. |
| 7,223,094 B2 | 5/2007 | Goebel |
| 7,225,056 B2 | 5/2007 | Bolduan et al. |
| 7,249,610 B2 | 7/2007 | Moses |
| 7,260,994 B2 | 8/2007 | Oboodi et al. |
| 7,290,502 B2 | 11/2007 | Kidd et al. |
| 7,290,902 B2 | 11/2007 | Suehiro et al. |
| 7,297,640 B2 | 11/2007 | Xie et al. |
| 7,302,863 B2 | 12/2007 | Kielb et al. |
| 7,319,300 B2 | 1/2008 | Hahn |
| 7,328,719 B2 | 2/2008 | Madden |
| 7,347,221 B2 | 3/2008 | Berger et al. |
| 7,360,751 B2 | 4/2008 | Herrfurth |
| 7,390,172 B2 | 6/2008 | Winkler |
| 7,398,796 B2 | 7/2008 | Hjorth et al. |
| 7,402,925 B2 | 7/2008 | Best et al. |
| 7,405,609 B2 | 7/2008 | Krotsch |
| 7,422,028 B2 | 9/2008 | Nugent et al. |
| 7,451,600 B2 | 11/2008 | Patel et al. |
| 7,451,644 B2 | 11/2008 | Karte |
| 7,453,696 B2 | 11/2008 | Tungl et al. |
| 7,461,828 B2 | 12/2008 | Kidprasert |
| 7,493,822 B2 | 2/2009 | Stewart et al. |
| 7,503,221 B2 | 3/2009 | Wade |
| 7,504,961 B2 | 3/2009 | Flanders |
| 7,520,487 B2 | 4/2009 | Mattes |
| 7,537,019 B2 | 5/2009 | Ting et al. |
| 7,543,604 B2 | 6/2009 | Benda |
| 7,553,151 B2 | 6/2009 | O'Mara et al. |
| 7,554,279 B2 | 6/2009 | Loffler et al. |
| 7,556,238 B2 | 7/2009 | Seberger |
| 7,565,225 B2 | 7/2009 | Dushane et al. |
| 7,574,896 B1 | 8/2009 | Cooper |
| 7,586,228 B2 | 9/2009 | Best |
| 7,586,276 B2 | 9/2009 | Dornhof |
| 7,624,755 B2 | 12/2009 | Benda et al. |
| 7,627,455 B2 | 12/2009 | Lenz et al. |
| 7,644,731 B2 | 1/2010 | Benda et al. |
| 7,647,842 B1 | 1/2010 | Killian et al. |
| 7,647,940 B2 | 1/2010 | Minervini et al. |
| 7,669,461 B2 | 3/2010 | Kates et al. |
| 7,688,011 B2 | 3/2010 | Berroth et al. |
| 7,715,168 B2 | 5/2010 | Gofman et al. |
| 7,735,509 B2 | 6/2010 | Galloway et al. |
| 7,740,024 B2 | 6/2010 | Brodeur et al. |
| 7,759,884 B2 | 7/2010 | Dufner et al. |
| 7,769,493 B2 | 8/2010 | Elshafei et al. |
| 7,811,069 B2 | 10/2010 | Fleig |
| 7,812,488 B2 | 10/2010 | Cosco et al. |
| 7,816,813 B2 | 10/2010 | Yagudayev et al. |
| 7,841,541 B2 | 11/2010 | Ardelt et al. |
| 7,869,971 B2 | 1/2011 | Varga |
| 7,880,421 B2 | 2/2011 | Karwath |
| 7,880,427 B2 | 2/2011 | Foll et al. |
| 7,890,216 B2 | 2/2011 | Boger et al. |
| 7,890,276 B2 | 2/2011 | Killion et al. |
| 7,891,972 B2 | 2/2011 | Blank et al. |
| 7,898,372 B2 | 3/2011 | Melchionne, Jr. |
| 7,902,776 B2 | 3/2011 | Karwath |
| 7,904,608 B2 | 3/2011 | Price |
| 7,905,251 B2 | 3/2011 | Flanders |
| 7,922,481 B2 | 4/2011 | Geiger et al. |
| 7,940,189 B2 | 5/2011 | Brown |
| 8,020,585 B2 | 9/2011 | Shock et al. |
| 8,024,978 B2 | 9/2011 | Khemet et al. |
| 8,036,837 B2 | 10/2011 | Wilke |
| 8,061,212 B2 | 11/2011 | Shubert |
| 8,066,255 B2 | 11/2011 | Wang |
| 8,099,248 B2 | 1/2012 | Umekage et al. |
| 8,104,510 B2 | 1/2012 | Ams et al. |
| 8,109,289 B2 | 2/2012 | Trnka et al. |
| 8,126,631 B2 | 2/2012 | Scalia, Jr. |
| 8,201,572 B2 | 6/2012 | Segal |
| 8,205,484 B2 | 6/2012 | Sasaki |
| 8,212,507 B2 | 7/2012 | Wystup et al. |
| 8,225,814 B2 | 7/2012 | Igarashi |
| 8,235,064 B2 | 8/2012 | Kasprzyk et al. |
| 8,240,636 B2 | 8/2012 | Smith |
| 8,258,660 B2 | 9/2012 | Strobel et al. |
| 8,265,794 B2 | 9/2012 | Minervini et al. |
| 8,271,141 B2 | 9/2012 | Cummings et al. |
| 8,286,937 B2 | 10/2012 | Forster |
| 8,297,948 B2 | 10/2012 | Laufer et al. |
| 8,307,845 B2 | 11/2012 | Kouchi et al. |
| 8,319,461 B2 | 11/2012 | Wystup et al. |
| 8,353,281 B2 | 1/2013 | Oberhomburg et al. |
| 8,380,448 B2 | 2/2013 | Franklin |
| 8,381,760 B2 | 2/2013 | Santinanavat et al. |
| 8,387,441 B2 | 3/2013 | Falta et al. |
| 8,424,563 B2 | 4/2013 | Haller et al. |
| 8,439,667 B2 | 5/2013 | Fan et al. |
| 8,473,229 B2 | 6/2013 | Kucera et al. |
| 8,500,441 B2 | 8/2013 | Geiger et al. |
| 8,539,972 B2 | 9/2013 | Xu |
| 8,550,109 B2 | 10/2013 | Miyata et al. |
| 8,567,757 B2 | 10/2013 | Pitchford et al. |
| 8,596,957 B2 | 12/2013 | Seebauer |
| 8,636,501 B2 | 1/2014 | Geiger et al. |
| 8,639,464 B2 | 1/2014 | Artiuch et al. |
| 8,677,913 B2 | 3/2014 | Kastingschafer et al. |
| 8,721,325 B2 | 5/2014 | Geiger et al. |
| 8,746,275 B2 | 6/2014 | Santinanavat et al. |
| 8,839,815 B2 | 9/2014 | Young et al. |
| 8,899,264 B2 | 12/2014 | Young et al. |
| 8,905,063 B2 | 12/2014 | Young et al. |
| 8,947,242 B2 | 2/2015 | Kucera et al. |
| 9,020,765 B2 | 4/2015 | Seebauer |
| 9,074,770 B2 | 7/2015 | Young et al. |
| 9,109,610 B2 | 8/2015 | Streng et al. |
| 9,222,816 B2 | 12/2015 | Patel et al. |
| 9,234,661 B2 | 1/2016 | Young et al. |
| 9,557,059 B2 | 1/2017 | Kucera et al. |
| 2002/0029808 A1 | 3/2002 | Friend et al. |
| 2002/0157713 A1 | 10/2002 | Pimouguet |
| 2002/0175791 A1 | 11/2002 | LaMarca et al. |
| 2003/0011136 A1 | 1/2003 | Ramirez et al. |
| 2003/0013054 A1 | 1/2003 | Fredricks et al. |
| 2003/0117098 A1 | 6/2003 | Berroth et al. |
| 2003/0150499 A1 | 8/2003 | Solet et al. |
| 2003/0167851 A1 | 9/2003 | Parker |
| 2003/0201414 A1 | 10/2003 | Freisinger et al. |
| 2004/0035211 A1 | 2/2004 | Pinto et al. |
| 2004/0129909 A1 | 7/2004 | Wiese |
| 2004/0214118 A1 | 10/2004 | Sullivan et al. |
| 2004/0217182 A1 | 11/2004 | St. Jean et al. |
| 2004/0263103 A1 | 12/2004 | Weisser et al. |
| 2005/0058961 A1 | 3/2005 | Moses |
| 2005/0166979 A1 | 8/2005 | Berger et al. |
| 2005/0199286 A1 | 9/2005 | Appleford et al. |

(56) References Cited

U.S. PATENT DOCUMENTS

| | | |
|---|---|---|
| 2005/0255418 A1 | 11/2005 | Goebel |
| 2005/0279956 A1 | 12/2005 | Berger et al. |
| 2006/0202572 A1 | 9/2006 | Tungl et al. |
| 2006/0226299 A1 | 10/2006 | Tungl et al. |
| 2006/0228237 A1 | 10/2006 | Winkler |
| 2006/0243334 A1 | 11/2006 | Brochhaus et al. |
| 2006/0260701 A1 | 11/2006 | Mattes |
| 2006/0272712 A1 | 12/2006 | Sontag |
| 2006/0278281 A1 | 12/2006 | Gynz-Rekowski et al. |
| 2007/0024225 A1 | 2/2007 | Hahn et al. |
| 2007/0024255 A1 | 2/2007 | Yasumura |
| 2007/0068511 A1 | 3/2007 | Bachinsky et al. |
| 2007/0082304 A1 | 4/2007 | Burnham et al. |
| 2007/0089789 A1 | 4/2007 | Mudd et al. |
| 2007/0095144 A1 | 5/2007 | Oboodi et al. |
| 2007/0164243 A1 | 7/2007 | Volz |
| 2007/0189739 A1 | 8/2007 | Dufner et al. |
| 2007/0241705 A1 | 10/2007 | Karwath |
| 2007/0256478 A1 | 11/2007 | Guadagnola et al. |
| 2007/0257628 A1 | 11/2007 | Gofman et al. |
| 2007/0261618 A1 | 11/2007 | Kastingshafer et al. |
| 2008/0035456 A1 | 2/2008 | Melchionne, Jr. |
| 2008/0099082 A1 | 5/2008 | Moenkhaus |
| 2008/0156077 A1 | 7/2008 | Flanders |
| 2008/0157707 A1 | 7/2008 | Jeske et al. |
| 2008/0297084 A1 | 12/2008 | Berroth et al. |
| 2008/0315807 A1 | 12/2008 | Loffler et al. |
| 2008/0318098 A1 | 12/2008 | Matsunaga |
| 2008/0318172 A1 | 12/2008 | Geiger et al. |
| 2009/0068503 A1 | 3/2009 | Yamazaki et al. |
| 2009/0105852 A1 | 4/2009 | Wintrich et al. |
| 2009/0120338 A1 | 5/2009 | Adendorf et al. |
| 2009/0126798 A1 | 5/2009 | Mather |
| 2009/0142717 A1 | 6/2009 | Lavelle |
| 2009/0146091 A1 | 6/2009 | Ams et al. |
| 2009/0148798 A1 | 6/2009 | Geiger et al. |
| 2009/0197212 A1 | 8/2009 | Masen |
| 2009/0240445 A1 | 9/2009 | Umekage et al. |
| 2009/0280989 A1 | 11/2009 | Astra et al. |
| 2009/0288399 A1 | 11/2009 | Fayard |
| 2009/0303076 A1 | 12/2009 | Setiadi et al. |
| 2010/0018324 A1 | 1/2010 | Killian et al. |
| 2010/0043896 A1 | 2/2010 | Shock et al. |
| 2010/0064818 A1 | 3/2010 | Shubert |
| 2010/0074777 A1 | 3/2010 | Laufer |
| 2010/0102259 A1 | 4/2010 | Forster |
| 2010/0112500 A1 | 5/2010 | Maiello et al. |
| 2010/0138167 A1 | 6/2010 | Bessyo et al. |
| 2010/0146939 A1 | 6/2010 | Sim et al. |
| 2010/0180688 A1 | 7/2010 | Khemet et al. |
| 2010/0180882 A1 | 7/2010 | Dberhornburg et al. |
| 2010/0193045 A1 | 8/2010 | Xu |
| 2010/0254826 A1 | 10/2010 | Streng et al. |
| 2010/0269931 A1 | 10/2010 | Seebauer |
| 2010/0282988 A1 | 11/2010 | Kasprzyk et al. |
| 2010/0315027 A1 | 12/2010 | Wystup et al. |
| 2011/0025237 A1 | 2/2011 | Wystup et al. |
| 2011/0033808 A1 | 2/2011 | Geiger et al. |
| 2011/0039217 A1 | 2/2011 | Happe |
| 2011/0041483 A1 | 2/2011 | Kapparos |
| 2011/0046903 A1 | 2/2011 | Franklin |
| 2011/0080072 A1 | 4/2011 | Strobel et al. |
| 2011/0137579 A1 | 6/2011 | Seebauer |
| 2011/0223548 A1* | 9/2011 | Fan .................. F23N 1/082 431/12 |
| 2011/0240157 A1 | 10/2011 | Jones et al. |
| 2011/0266473 A1* | 11/2011 | Santinanavat ....... G05D 7/0617 251/30.01 |
| 2011/0270544 A1 | 11/2011 | Kucera et al. |
| 2011/0284777 A1 | 11/2011 | Pitchford et al. |
| 2012/0107753 A1 | 5/2012 | Kemp |
| 2013/0152673 A1 | 6/2013 | Young et al. |
| 2013/0153036 A1 | 6/2013 | Young et al. |
| 2013/0153041 A1 | 6/2013 | Kucera et al. |
| 2013/0153042 A1 | 6/2013 | Young et al. |
| 2013/0153062 A1 | 6/2013 | Young et al. |
| 2013/0153798 A1 | 6/2013 | Kucera et al. |
| 2013/0154841 A1 | 6/2013 | Kucera et al. |
| 2014/0080075 A1 | 3/2014 | Young et al. |
| 2014/0096850 A1 | 4/2014 | Filkovski et al. |
| 2015/0045971 A1 | 2/2015 | Endel et al. |
| 2015/0107675 A1 | 4/2015 | Kucera |
| 2016/0123584 A1 | 5/2016 | Young et al. |
| 2016/0326967 A1 | 11/2016 | Yamamoto et al. |
| 2017/0134214 A1 | 5/2017 | Sethuraman et al. |

FOREIGN PATENT DOCUMENTS

| | | |
|---|---|---|
| DE | 19617852 A1 | 10/1997 |
| DE | 19824521 A1 | 12/1999 |
| DE | 102005033611 B3 | 10/2006 |
| EP | 0062854 A1 | 10/1982 |
| EP | 0068517 A1 | 1/1983 |
| EP | 0275439 A1 | 7/1988 |
| EP | 0282758 A2 | 9/1988 |
| EP | 0356690 A1 | 3/1990 |
| EP | 0522479 A2 | 1/1993 |
| EP | 0563787 A1 | 10/1993 |
| EP | 0617234 A1 | 9/1994 |
| EP | 0645562 A1 | 3/1995 |
| EP | 0652501 A2 | 5/1995 |
| EP | 0664422 A1 | 7/1995 |
| EP | 0665396 A1 | 8/1995 |
| EP | 0678178 A1 | 10/1995 |
| EP | 0744821 A2 | 11/1996 |
| EP | 0757200 A2 | 2/1997 |
| EP | 0822376 A2 | 2/1998 |
| EP | 0817931 B1 | 12/1998 |
| EP | 0881435 A1 | 12/1998 |
| EP | 0896191 A2 | 2/1999 |
| EP | 0896192 A2 | 2/1999 |
| EP | 0907052 A2 | 4/1999 |
| EP | 0817934 B1 | 5/1999 |
| EP | 0952357 A1 | 10/1999 |
| EP | 0976957 A2 | 2/2000 |
| EP | 1031792 A2 | 8/2000 |
| EP | 1069357 A2 | 1/2001 |
| EP | 1073192 A2 | 1/2001 |
| EP | 1084357 A2 | 3/2001 |
| EP | 1084358 A1 | 3/2001 |
| EP | 1121511 A1 | 8/2001 |
| EP | 1176317 A1 | 1/2002 |
| EP | 1186779 A1 | 3/2002 |
| EP | 1157205 B1 | 9/2002 |
| EP | 0992658 B1 | 5/2003 |
| EP | 1323966 A1 | 7/2003 |
| EP | 1078187 B1 | 8/2003 |
| EP | 1382907 A1 | 1/2004 |
| EP | 1403885 A2 | 3/2004 |
| EP | 1269054 B1 | 8/2004 |
| EP | 1484509 A1 | 12/2004 |
| EP | 1191676 B1 | 1/2005 |
| EP | 1275039 B1 | 1/2005 |
| EP | 1446607 B1 | 3/2005 |
| EP | 1510756 A1 | 3/2005 |
| EP | 1299665 B1 | 4/2005 |
| EP | 1324496 B1 | 6/2005 |
| EP | 1584870 A2 | 10/2005 |
| EP | 1243857 B1 | 12/2005 |
| EP | 1282798 B1 | 12/2005 |
| EP | 1424708 B1 | 12/2005 |
| EP | 0843287 B1 | 2/2006 |
| EP | 1346463 B1 | 3/2006 |
| EP | 1535388 B1 | 6/2006 |
| EP | 1703140 A1 | 9/2006 |
| EP | 1703146 A2 | 9/2006 |
| EP | 1183772 B1 | 10/2006 |
| EP | 1303718 B1 | 10/2006 |
| EP | 1314240 B1 | 10/2006 |
| EP | 1715229 A2 | 10/2006 |
| EP | 1256763 B1 | 11/2006 |
| EP | 1727268 A2 | 11/2006 |
| EP | 1559936 B1 | 12/2006 |
| EP | 1748534 A2 | 1/2007 |

(56) References Cited

FOREIGN PATENT DOCUMENTS

| | | |
|---|---|---|
| EP | 1748545 A2 | 1/2007 |
| EP | 1327808 B1 | 2/2007 |
| EP | 1329659 B1 | 2/2007 |
| EP | 1291532 B1 | 6/2007 |
| EP | 1610046 B1 | 6/2007 |
| EP | 1592905 B1 | 7/2007 |
| EP | 1610045 B1 | 7/2007 |
| EP | 1727261 B1 | 10/2007 |
| EP | 1860328 A1 | 11/2007 |
| EP | 1626321 B1 | 2/2008 |
| EP | 1848907 B1 | 4/2008 |
| EP | 1936778 A2 | 6/2008 |
| EP | 1413045 B1 | 7/2008 |
| EP | 1499008 B1 | 10/2008 |
| EP | 1882882 A2 | 10/2008 |
| EP | 1536169 B1 | 11/2008 |
| EP | 1298679 B1 | 12/2008 |
| EP | 1714040 B1 | 12/2008 |
| EP | 2014979 A2 | 1/2009 |
| EP | 1669648 B1 | 2/2009 |
| EP | 2048439 A1 | 4/2009 |
| EP | 1659462 B1 | 6/2009 |
| EP | 2093545 B1 | 8/2009 |
| EP | 2107248 A2 | 10/2009 |
| EP | 2116857 A1 | 11/2009 |
| EP | 2119946 A1 | 11/2009 |
| EP | 1370787 B1 | 3/2010 |
| EP | 1413044 B1 | 3/2010 |
| EP | 2164164 A1 | 3/2010 |
| EP | 2177796 A2 | 4/2010 |
| EP | 2178201 A1 | 4/2010 |
| EP | 1970610 B1 | 5/2010 |
| EP | 2197101 EP | 6/2010 |
| EP | 2068056 B1 | 8/2010 |
| EP | 1712800 B1 | 10/2010 |
| EP | 2118493 B1 | 10/2010 |
| EP | 2242344 A1 | 10/2010 |
| EP | 1715582 B1 | 11/2010 |
| EP | 1675757 B1 | 12/2010 |
| EP | 2267883 A1 | 12/2010 |
| EP | 1703139 B1 | 1/2011 |
| EP | 2286976 A1 | 2/2011 |
| EP | 1596495 B1 | 4/2011 |
| EP | 2212984 B1 | 4/2011 |
| EP | 2306622 A1 | 4/2011 |
| EP | 2010500 B1 | 6/2011 |
| EP | 2113696 BI | 7/2011 |
| FR | 2609154 A1 | 7/1988 |
| GB | 2099158 A | 12/1982 |
| GB | 2327750 A | 2/1999 |
| JP | 02086258 A | 3/1990 |
| JP | 05219760 A | 8/1993 |
| JP | 9061284 A | 3/1997 |
| JP | 9184600 A | 7/1997 |
| JP | 2004125809 A | 4/2004 |
| JP | 2004309159 A | 11/2004 |
| JP | 2008135922 A | 6/2008 |
| JP | 2008286478 A | 11/2008 |
| SU | 744877 B | 6/1980 |
| WO | 8705375 A1 | 9/1987 |
| WO | 9627095 A1 | 9/1996 |
| WO | 9729538 A1 | 8/1997 |
| WO | 9801709 A2 | 1/1998 |
| WO | 9924758 A1 | 5/1999 |
| WO | 9960292 A1 | 11/1999 |
| WO | 9964769 A2 | 12/1999 |
| WO | 9964770 A1 | 12/1999 |
| WO | 0028215 A1 | 5/2000 |
| WO | 0106179 A1 | 1/2001 |
| WO | 0133078 A1 | 5/2001 |
| WO | 0161226 A1 | 8/2001 |
| WO | 0173297 A2 | 10/2001 |
| WO | 0190617 A1 | 11/2001 |
| WO | 0204852 A1 | 1/2002 |
| WO | 02077502 A1 | 10/2002 |
| WO | 02084156 A1 | 10/2002 |
| WO | 02086365 A1 | 10/2002 |
| WO | 02086918 A1 | 10/2002 |
| WO | 02097840 A1 | 12/2002 |
| WO | 2004059830 A2 | 7/2004 |
| WO | 2004070245 A1 | 8/2004 |
| WO | 2005042313 A1 | 5/2005 |
| WO | 2005076455 A1 | 8/2005 |
| WO | 2005076456 A1 | 8/2005 |
| WO | 2005085652 A1 | 9/2005 |
| WO | 2005094150 A1 | 10/2005 |
| WO | 2006000366 A1 | 1/2006 |
| WO | 2006000367 A1 | 1/2006 |
| WO | 2006039956 A1 | 4/2006 |
| WO | 2006042635 A1 | 4/2006 |
| WO | 2006053816 A1 | 5/2006 |
| WO | 2006077069 A1 | 7/2006 |
| WO | 2006088367 A2 | 8/2006 |
| WO | 2007012419 A2 | 2/2007 |
| WO | 2007018876 A1 | 2/2007 |
| WO | 2007093312 A1 | 8/2007 |
| WO | 2007140927 A1 | 12/2007 |
| WO | 2008061575 A1 | 3/2008 |
| WO | 2008039061 A1 | 4/2008 |
| WO | 2008119404 A1 | 10/2008 |
| WO | 2008141911 A1 | 11/2008 |
| WO | 2008148401 A1 | 12/2008 |
| WO | 2009000481 A1 | 12/2008 |
| WO | 2009049694 A1 | 4/2009 |
| WO | 2009065815 A2 | 5/2009 |
| WO | 2009073510 A2 | 6/2009 |
| WO | 2009089857 A1 | 7/2009 |
| WO | 2009126020 A1 | 10/2009 |
| WO | 2010018192 A2 | 2/2010 |
| WO | 2010052137 A2 | 5/2010 |
| WO | 2010056111 A1 | 5/2010 |
| WO | 2010083877 A1 | 7/2010 |
| WO | 2011010274 A1 | 1/2011 |
| WO | 2011045776 A1 | 4/2011 |
| WO | 2011047895 A1 | 4/2011 |
| WO | 2011051002 A1 | 5/2011 |
| WO | 2011069805 A1 | 6/2011 |
| WO | 2011072888 A1 | 6/2011 |
| WO | 2011092011 A2 | 8/2011 |
| WO | 2011095928 A1 | 8/2011 |

OTHER PUBLICATIONS

Communication of a Notice of Opposition for EP Application Serial No. EP12196398.7, dated Feb. 15, 2016.
Honeywell, "V4730C/V8730C/V4734C 1:1 Gas/Air Servo Regulated Gas Valves, Product Data," 16 pages, 2006.
Honeywell, "V4943A/V8943A On/Off Diaphragm Gas Valves, Product Data," 8 pages, Apr. 2009.
Honeywell, "V5055A-F Industrial Gas Valves, Product Data," 12 pages, Nov. 2012.
https://en.wikipedia.org/wiki/SCADA, "SCADA," 10 pages, printed Mar. 29, 2016.
Maxon Corporation, "Functional Testing of Maxon Shut-off Valves, Valve Technical Data," 3 pages, 2008.
Response to Opposition for EP Application Serial No. EP12196398.7, filed Jul. 15, 2016.
"Flexible, Compact and with a High Performance—the New Valvario, G. Kromschroder AG Launches it's New, Improved Series of Gas Fittings," Press Release, 2 pages, 2003.
"Large-Scale Linearization Circuit for Electrostatic Motors" IBM Technical Disclosure Bulletin, IBM Corporation, vol. 37, No. 10, pp. 563-564, Oct. 1, 1994.
ASCO RedHat, "2-Way Normally Closed General Purpose & Watertight Enclosure Gas Shutoff Valves ¾" to 3" NPT, 2/2 Series 8214 (200)," 8 pages, prior to Dec. 15, 2011.
ASCO RedHat, "2-Way Normally Closed General Purpose & Watertight Enclosure Gas Shutoff Valves ¾" to 3" NPT, 2/2 Series 8214 (200) AH(E) V710(B)," 6 pages, prior to Dec. 15, 2011.
ASCO Valve, Inc., "8290 Series Angle Body Piston Valves, Introducing the All New 8290 Assembly Configurator," 12 pages, prior to Dec. 15, 2011.

(56) References Cited

OTHER PUBLICATIONS

ASCO, "2-Way Normally Closed V710(B) Valve Body Pipe Sizes ¾" to 3" NPT, Series V710(B)," 4 pages, prior to Dec. 15, 2011.
ASCO, "On/Off General Purpose & Watertight Hydramotor Actuator for Use with V710 Gas Valve Body, Series AH2E," 2 pages, prior to Dec. 15, 2011.
Athavale et al., "Coupled Electrostatics-Structures-Fluidic Simulations of a Bead Mesopump," Proceedings of the International Mechanical Engineers Congress & Exhibition, pp. 1-7, Oct. 1999.
Bertz et al., "Silicon Grooves With Sidewall Angles Down to 1° made by Dry Etching," pp. 331-339, prior to Dec. 29, 2004.
Bonne et al. "Actuation-Based Fuel Gas Microsensors," IGT Symposium on Natural Gas Quality, Energy Measurement, Metering and Utilization Practices, 17 pages, Mar. 2001.
Branebjerg, "A New Electrostatic Actuator Providing Improved Stroke Length and Force," IEEE, pp. 6-11, Feb. 4-7, 1992.
Bustgens et al., "Micropump Manufactured by Thermoplastic Molding," IEEE, pp. 18-21, 1994.
Cabuz et al., "Factors Enhancing the Reliability of Touch-Mode Electrostatic Actuators," Sensors and Actuators 79, pp. 245-250, 2000.
Cabuz et al., "Mesoscopic Sampler Based on 3D Array of Electrostatically Activated Diaphragms," Proceedings of the 10th Int. Conf. on Solid-State Sensors and Actuators, Transducers 1999.
Cabuz et al., "The Dual Diaphragm Pump," 4 pages prior to Dec. 29, 2004.
Cabuz, "Dielectric Related Effects in Micromachined Electrostatic Actuators," IEEE, 1999 Conference on Electrical Insulation and Dielectric Phenomena, pp. 327-332, 1999.
Cabuz, "Electrical Phenomena at the Interface of Rolling-Contact, Electrostatic Actuators," 16 pages, prior to Dec. 29, 2004.
Cabuz, et al., "High Reliability Touch-Mode Electrostatic Actuators", Technical Digest of the Solid State Sensor and Actuator Workshop, Hilton Head, S.C., pp. 296-299, Jun. 8-11, 1998.
Cabuz. "Tradeoffs in MEMS Materials," SPIE, vol. 2881, pp. 160-170, prior to Dec. 29, 2004.
Carlisle, "10 Tips on Valve-Proving Systems," Karl Dungs Inc., 5 pages, Aug. 1, 2002, printed May 23, 2012.
European Search Report for EP Application No. 12196394.6 dated May 23, 2013.
European Search Report for EP Application No. 12196396.1 dated Jun. 11, 2013.
European Search Report for EP Application No. 12196398.7 dated Jun. 11, 2013.
Examination Report for EP Application No. 12196398.7, dated Apr. 11, 2014.
CSA, "B149.351-07 Supplement No. 1 to CAN/CAS-B149.3-05 Code for the Field Approval of Fuel-Related Components on Appliances and Equipment," 40 pages, Jan. 2007.
Dungs Combustion Controls, "Double Solenoid Valve Combined Pressure Regulator and Safety Valves Servo Pressure Regulator, MBC- . . . -SE DN 65 DN 125," 8 pages, prior to Dec. 15, 2011.
Dungs Combustion Controls, "Double Solenoid Valve Combined Pressure Regulator and Safety Valves Infinitely Variable Operating Mode, MBC- . . . -VEF DN65-DN100," 8 pages, prior to Dec. 15, 2011.
Dungs Combustion Controls, "Double Solenoid Valve Control and Safety Combination Valve Servo Pressure Controller, DMV-SE 507/11-525/11," 8 pages, prior to Dec. 15, 2011.
Dungs Combustion Controls, "Double Solenoid Valve Regulator and Safety Combination Infinitely Variable Floating Operation, DMV-VEF 507-525," 8 pages, prior to Dec. 15, 2011.
Dungs Combustion Controls, "Gas/Air Ratio Control MB-VEF, DMV-VEF," 15 pages, prior to Dec. 15, 2011.
Dungs Combustion Controls, "GasMultiBloc Combined Regulator and Safety Shut-Off Valves Two-Stage Function, MB-ZRD(LE) 415-420 B01," pp. 1-6, prior to Dec. 15, 2011.
Dungs Combustion Controls, "GasMultiBloc Combined Regulator and Safety Valve Infinitely Variable Air/Gas Ratio Control Mode, MBC-300-VEF, MBC-700-VEF, MBC-1200-VEF," 8 pages, prior to Dec. 15, 2011.
Dungs Combustion Controls, "GasMultiBloc Combined Servo Pressure Regulator and Safety Shut-Off Valves, MBC-300-SE, MBC-700-SE, MBC-1200-SE, MBC-300-N, MBC-700-N," 8 pages, prior to Dec. 15, 2011.
Dungs Combustion Controls, "Pressure Regulator FRN Zero Pressure Regulator," 4 pages, prior to Dec. 15, 2011.
Dungs Combustion Controls, "Pressure Regulator FRS," 6 pages prior to Dec. 15, 2011.
Dungs Combustion Controls, "Pressure Regulator FRU Circulation Regulator," 4 pages, prior to Dec. 15, 2011.
Dungs Combustion Controls, "Pressure Switch for Gas, Air, Flue Gases and Combustion Products, GW 500 A4, GW 500 A4/2" 6 pages, prior to Dec. 15, 2011.
Dungs Combustion Controls, "Program," 4 pages, prior to Dec. 15, 2011.
Dungs Combustion Controls, "Valve Testing System VPS 504 for Multiple Actuators," 12 pages, prior to Dec. 15, 2011.
Dungs Combustion Controls, "Valve Testing System VPS 508 for Multiple Actuators," 12 pages, prior to Dec. 15, 2011.
Freund et al., "A Chemically Diverse Conducting Polymer-Based 'Electronic Nose'," Proceedings of the National Academy of Sciences of the United States of America, vol. 92, No. 7, pp. 2652-2656, Mar. 28, 1995.
Halg, "On a Nonvolatile Memory Cell Based on Micro-Electro-Mechanics," IEEE pp. 172-176, 1990.
Honeywell Inc., "Hall Effect Sensing and Application," 126 pages, prior to Dec. 15, 2011.
Honeywell, "RM7800L1087; RM7840G1022,L1075,L1091; EC7840L1014 Relay Modules with Valve Proving," Installation Instructions, 32 pages, 2009.
Korte et al., "Smart Valve Positioners and Their Use in Safety Instrumented Systems," Industrial Valves, pp. 41-47, 2009.
Kromschroder, "Governor with Solenoid Valve VAD Air/Gas Ratio Control with Solenoid Valve VAG," 8 pages, prior to Dec. 15, 2011.
Kromschroder, "Governor with Solenoid Valve VAD Air/Gas Ratio Control with Solenoid Valve VAG," 24 pages, prior to Dec. 15, 2011.
Kromschroder, "Solenoid Valves for Gas VAS," 28, pages, prior to Dec. 15, 2011.
Kromschroder, "Solenoid Valves for Gas VAS," 8 pages, prior to Dec. 15, 2011.
Kromschroder, "Tightness Control TC," 8 pages, 2011.
Minami et al., "Fabrication of Distributed Electrostatic Micro Actuator (DEMA)," IEEE Journal of Microelectromechanical Systems, vol. 2, No. 3, pp. 121-127, Sep. 1993.
Ohnstein et al., "Micromachined Silicon Microvalve," IEEE, pp. 95-98, 1990.
Porex Technologies, brochure, 4 pages, prior to Dec. 29, 2004.
Shikida et al., "Characteristics of an Electrostatically-Driven Gas Valve Under High Pressure Conditions," IEEE, pp. 235-240, 1994.
Shikida et al., "Electrostatically Driven Gas Valve With High Conductance," IEEE Journal of Microelectromechanical Systems, vol. 3, No. 2, pp. 76-80, Jun. 1994.
Shikida et al., "Fabrication of an S-Shaped Microactuator," IEEE Journal of Microelectromechanical Systems, vol. 6, No. 1, pp. 18-24, Mar. 1997.
Siemens Building Technologies, "Double Gas Valves VGD20 . . . , VGD40 . . . ," 12 pages, Aug. 5, 2002.
Siemens Building Technologies, Inc., "Siemens Technical Instructions Document No. 155-512P25VG . . .," 12 pages, Aug. 11, 2005.
Siemens Building Technologies, Inc., "SKP . . . 15U . . . Gas Valve Actuator with Safety Shutoff Function," Document No. 155-751 SKP15 . . . U . . . , 5 pages, Jul. 1, 2005.
Siemens Building Technologies, Inc., "SKP25 . . . U . . . Air/Gas Ratio Controlling Gas Valve Actuator with Safety Shutoff Function," Technical Instructions Document No. 155-754, SKP25 . . . U, 9 pages, Jul. 1, 2005.

(56) References Cited

OTHER PUBLICATIONS

Siemens Building Technologies, Inc., "SKP25 . . . U . . . Pressure Regulating Gas Valve Actuator with Safety Shut-Off Function," Technical Instructions Document No. 155-752, SKP25 . . . U, 7 pages, Jul. 1, 2005.

Srinivasan et al., "Self-Assembled Fluorocarbon Films for Enhanced Stiction Reduction", IEEE Transducers, 1997 International Conference on Solid-State Sensors and Actuators, Chicago, pp. 1399-1402, Jun. 16-19, 1997.

Universal Metering, "SmartValve Wireless Shut-Off Valve," Universal Metering Ltd., 4 pages, prior to Mar. 12, 2013.

Wagner et al., "Bistable Microvalve with Pneumatically Coupled Membranes," IEEE, pp. 384-388, 1996.

Wilkerson, "Understanding Valve Actuatior Diagnostics," Control Engineering, vol. 56, No. 11, 4 pages, Nov. 2009.

www.combustion911.com/products/valve-proving-controls-tc-410.html, "Kromschroeder Valve Proving Controls TC410," 7 pages, prior to Dec. 15, 2011, printed May 23, 2012.

Yang et al., "Fluorescent Porous Polymer Films as TNT Chemosensors: Electronic and Structural Effects", J. Am. Chem. Soc., pp. 11864-11873, 1998.

Yang et al., "Porous Shape Persistent Fluorescent Polymer Films: An Approach to TNT Sensory Materials", J. Am. Chem. Soc., pp. 5321-5322, 1998.

\* cited by examiner

US 11,073,281 B2

CLOSED-LOOP PROGRAMMING AND CONTROL OF A COMBUSTION APPLIANCE

This application claims the benefit of priority of U.S. Provisional Application Ser. No. 62/612,250, filed Dec. 29, 2017, and entitled "CLOSED-LOOP PROGRAMMING AND CONTROL OF A COMBUSTION APPLIANCE", which is incorporated herein by reference.

TECHNICAL FIELD

The present disclosure relates generally to systems and methods for defining an air/fuel ratio for a burner of a combustion appliance, and more particularly to programming a controller of a valve assembly and controlling operation of a combustion appliance based on defined air-fuel ratios.

BACKGROUND

The air/fuel ratio used during the operation of a combustion appliance can affect the efficiency and emissions of the combustion appliance. Examples of such combustion appliances include furnaces, water heaters, boilers, direct/indirect make-up air heaters, power/jet burners and any other residential, commercial or industrial combustion appliance. In many cases, a combustion appliance can be modulated over a plurality of burner loads, with each burner load resulting in a different heat output. At higher burner loads, more fuel and more air are provided to the burner, and at lower burner loads less fuel and less air are provided to the burner.

In many cases, the combustion appliance may include a burner that is fed air by a modulating blower or the like and fuel is fed by a modulating gas valve. The modulating gas valve may have an air/fuel controller that is designed to control the air/fuel ratio that is delivered to the burner. In some cases, the air/fuel controller may not have direct control over the burner load of the combustion appliance. In other cases, the air/fuel controller may be a slave device and simply receive a burner load command from an external controller, and may respond by modulating the gas valve to provide a desired air/fuel ratio to the burner at the commanded burner load. In some instances, the modulating the gas valve may be pneumatically controlled. In other instances, the modulating the gas valve may be controlled by an electronically controlled actuator.

In many cases, an air/fuel ratio versus burner load curve is set during a commissioning process of the gas valve at the time of installation or during subsequent maintenance. The particular air/fuel ratio versus burner load curve may depend on the particular equipment involved and/or the particular application at hand. Commissioning the air/fuel ratio versus burner load can be a time consuming and tedious process.

SUMMARY

The present disclosure relates generally to systems and methods for defining an air/fuel ratio for a burner of a combustion appliance, and more particularly to programming a controller of a valve assembly. The present disclosure also relates to controlling operation of a burner of a combustion appliance based on defined air-fuel ratios.

In one example of the disclosure, an auto-programming control system for a combustion burner having a plurality of burner firing rates is disclosed. The auto-programming control system may include a controller, and memory in communication with the controller. The controller may be configured to control an air-fuel ratio of a fluid flow to a combustion chamber. The controller may be configured to fire the combustion burner at each of the plurality of burner firing rates, and at each of the plurality of burner firing rates the controller may be configured to set an air-fuel setting, receive a measure of a combustion constituent exiting the combustion chamber at the air-fuel setting, determine a difference between the measure of the combustion constituent exiting the combustion chamber and a set point at the air-fuel setting, adjust the air-fuel setting until the difference between the measure of the combustion constituent exiting the combustion chamber and the set point is below a threshold, and save an association between the air-fuel setting and the corresponding one of the plurality of burner firing rates to the memory, and then move to a next burner firing rate of the plurality of burner firing rates and repeat.

In another example of the disclosure, a closed loop control system may include a controller and an input/output port in communication with the controller. The controller may be configured to control an air-fuel ratio of a fluid flow to a combustion chamber. The controller may be further configured to receive via the input/output port a measure of a combustion constituent exiting the combustion chamber, compare the measure of the combustion constituent exiting the combustion chamber to a set point, and control the air-fuel ratio in the fluid flow to the combustion chamber based at least in part on the comparison of the measure of the combustion constituent exiting the combustion chamber to the set point.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings, in which.

Figure 1:
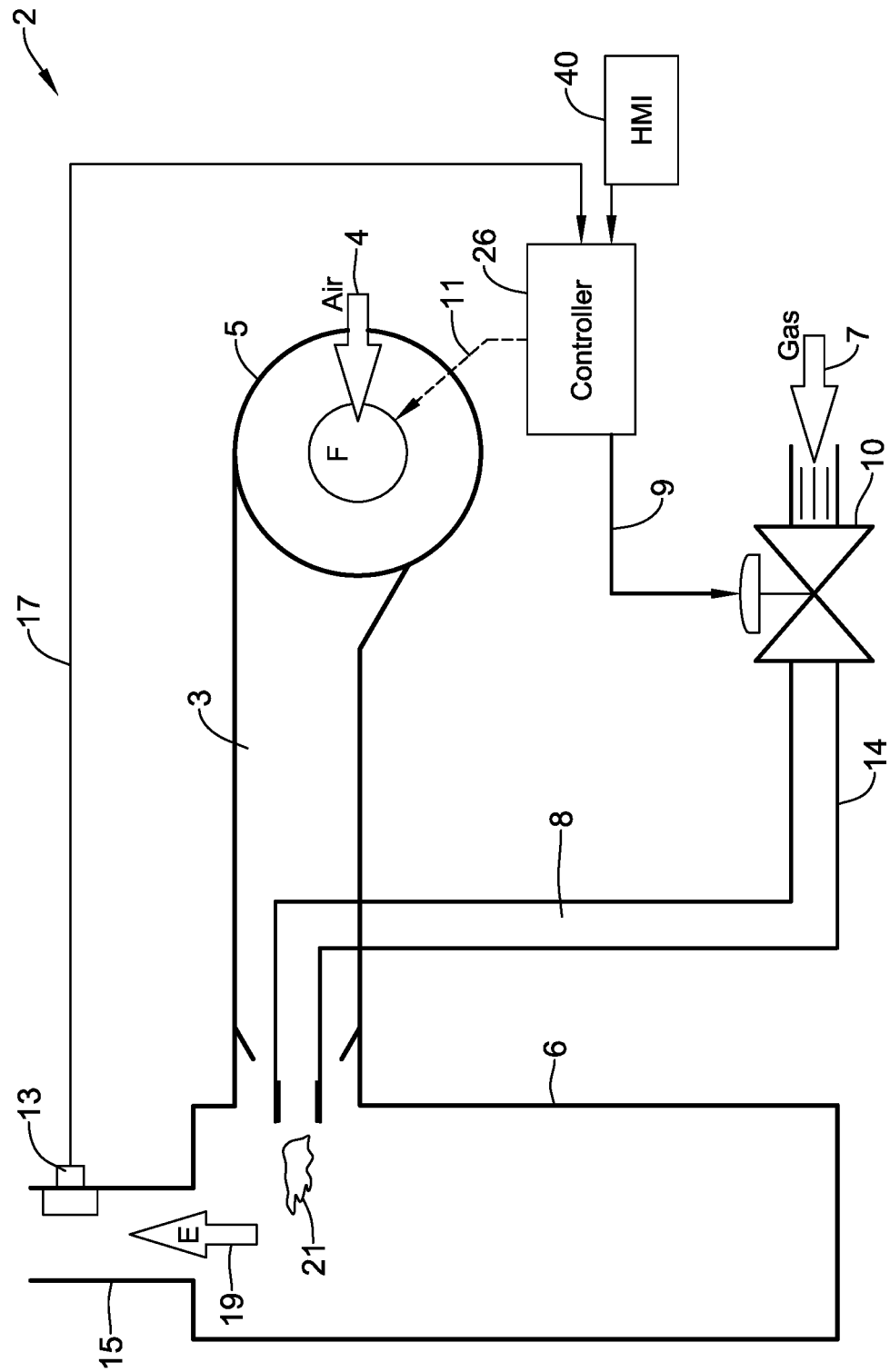
FIG. 1 is a schematic diagram of an illustrative burner control system.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The detailed description and drawings show several illustrative embodiments which are meant to be illustrative of the claimed disclosure.

Valves may be added to fluid supply lines including, but not limited to, gas valves added to supply lines configured to provide fuel to a burner of a combustion appliance. In some cases, an air to fuel ratio (also referred to as air/fuel ratio, air-fuel ratio, or A/F ratio) may depend on or may be proportional to a burner load of the combustion appliance. The A/F ratio may affect the burner efficiency and/or burner emissions differently at different burner loads (i.e. burner firing rates). In heating (and/or other fuel burning) applications, adjustments to an air/fuel ratio in real time based on sensor feedback and/or based on a burner load or firing rate may be used to achieve set points for combustion constituents (e.g., $CO_2$, $O_2$, CO, etc.) exiting a combustion chamber over an entire burner load or burner firing rate range of the system.

In some cases, a gas valve assembly may be configured to monitor and/or control various operations including, but not limited to, gas flow and/or gas consumption, electronic cycle counting, overpressure diagnostics, high gas pressure and low gas pressure detection, valve proving system tests, valve leakage tests, proof of valve closure tests, diagnostic communications, and/or any other suitable operation as desired. In addition, a gas valve assembly may be configured to facilitate adjusting A/F ratio in real or near real time based on sensor feedback and/or based on a burner load or firing rate, as further described below.

FIG. 1 is schematic diagram of a burner control system 2 having a fuel and air mixture where an air/fuel ratio is adjustable. The burner control system 2 may have an air supply channel 3 for supplying air 4 into a chamber 6 (e.g., a combustion chamber or other suitable chamber) with a fan 5 at one end of the channel 3. At the other end of channel 3, the supplied air 4 may enter the chamber 6. Fuel 7 (e.g., gas or other suitable fuel) may be injected, via a fuel channel 8, into the airflow at a location in the air supply channel 3 and/or in the chamber 6. The fuel channel 8 may be connected to a gas valve assembly 10 and in communication with the air supply channel 3 and/or the chamber 6. The burner control system 2 depicted in FIG. 1 is only an illustrative schematic depiction and it is contemplated the burner control system 2 may have one or more additional or alternative components and/or configurations.

A valve controller 26 may be in communication with the valve assembly 10 or may be part of the valve assembly 10, as discussed in greater detail below. In some cases, the valve controller 26 may provide a signal 9 to the valve assembly 10 to adjust a position of a valve of the valve assembly 10. In some cases, the valve assembly 10 may be motorized and may be configured to open and/or close the valve thereof incrementally according to the signal 9. For example, the valve controller 26 may send the signal 9 to the valve assembly 10 to open the valve when more fuel is needed and may send the signal 9 to the valve assembly 10 to close the valve when less fuel is needed.

In some cases, the valve controller 26 may be connected to the fan 5, which may be varied in speed according to a signal 11 from the valve controller 26 to vary a flow of air 4 through the air supply channel 3 and establish a burner load or firing rate. Alternatively or additionally, the fan 5 may be configured to receive a control signal to vary a flow of air 4 through the air supply channel 3 from a burner controller, combustion appliance controller, or other controller separate from the valve controller 26 to facilitate establishing the burner load or firing rate. In such cases, the valve controller 26 may also be configured to receive a control signal indicating a set speed of the fan 5 from the burner controller, combustion appliance controller, or other controller separate from the valve controller 26. Changing speeds of the fan 5 may increase or decrease the burner load or firing rate of the burner or combustion appliance, as the burner load or firing rate may be or may be a function of the speed of the fan.

An air/fuel ratio of the burner control system 2 may be controlled to achieve a desired measure of combustion constituents exiting the chamber 6. In some cases, a combustion sensor 13 may be mounted at an exhaust port 15 of the chamber 6 to provide a signal 17 (e.g., via a wired or wireless communication path) to the valve controller 26, where the combustion sensor 13 may indicate a measure and/or other information of combustion constituents 19 emanating from a flame 21. In some cases, the combustion sensor 13 may be utilized during setup and/or at other times to program the valve controller 26 to include a table of air/fuel ratios for one or more burner loads or firing rates of the combustion appliance that are configured to achieve set points for measures of the combustion constituents 19 in the exhaust from the chamber 6. In such cases, the combustion sensor 13 may be removable and may be utilized only for programming and setting up the valve controller 26, but this is not required. Alternatively or in addition, the combustion sensor 13 may be permanently mounted or otherwise mounted at the exhaust port 15 of the chamber 6 and the signal 17 from the combustion sensor 13 may be used to provide a closed loop control of the air/fuel ratio of fluid flow to the chamber 6 based on the signal 17.

A separate device 40 (e.g., a human-machine-interface (HMI)) may be utilized to facilitate setting up and/or programming the valve controller 26 in the manners described herein and/or in one or more other suitable manners. As shown in FIG. 1, the separate device 40 may be in communication with the valve controller 26. Alternatively, the separate device 40 may be omitted and the valve controller 26 and/or one or more other suitable controllers of the combustion appliance may be configured to facilitate setting up and/or programming the valve controller 26.

Figure 2:
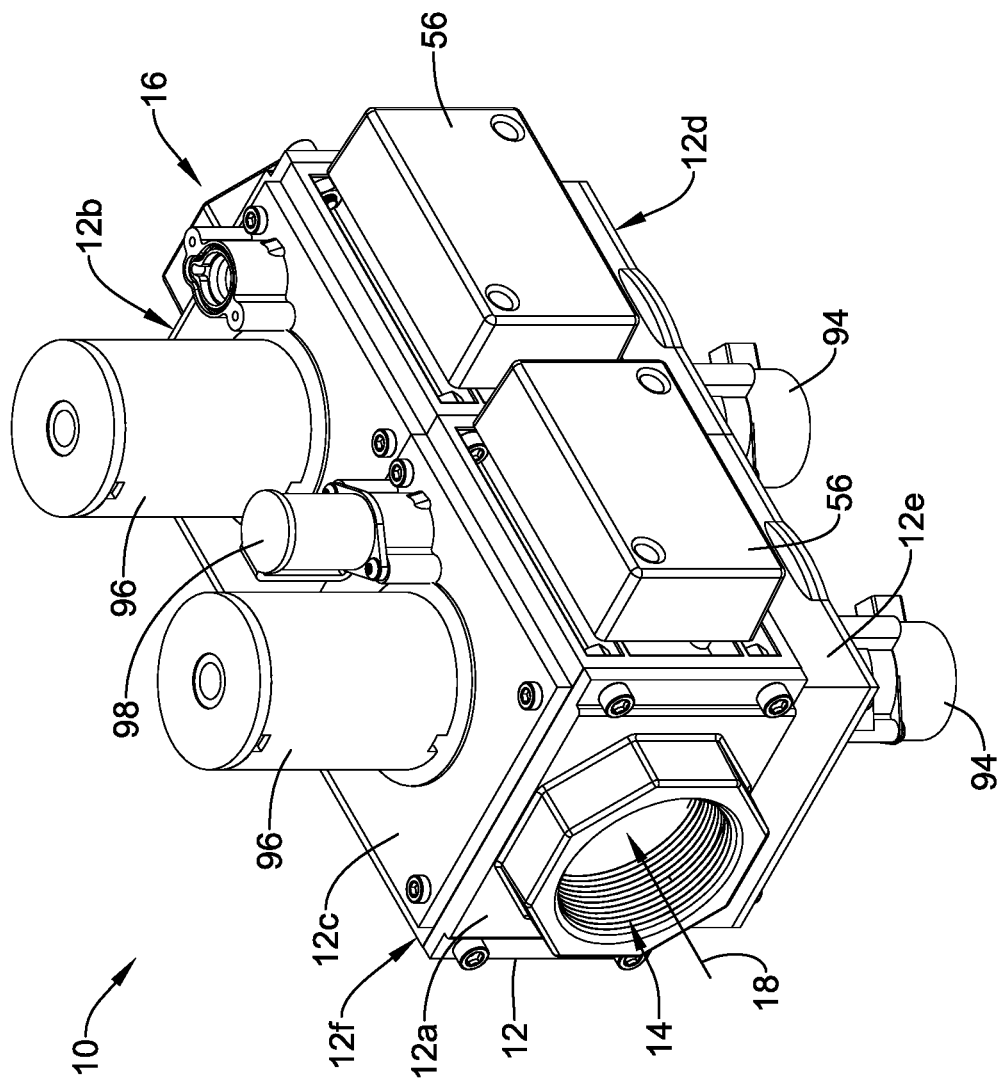
FIG. 2 is a schematic perspective view of an illustrative gas valve assembly.

FIGS. 2-7 depict schematic views of an illustrative valve assembly 10 for controlling gas flow to a combustion appliance or other similar or different device. FIG. 2 depicts a schematic perspective view of the illustrative valve assembly 10. In the illustrative embodiment, the gas valve assembly 10 may include a valve body 12, which may generally be a six sided shape or may take on other suitable shapes as desired, and may be formed as a single body or may be multiple pieces connected together. As shown, the valve body 12 may be a six-sided shape having a first end 12a, a second end 12b, a top 12c, a bottom 12d, a back 12e and a front 12f, as depicted in the various views of FIGS. 2-3. The terms top, bottom, back, front, left, and right are relative terms used merely to aid in discussing the drawings, and are not meant to be limiting in any manner.

Figure 7:
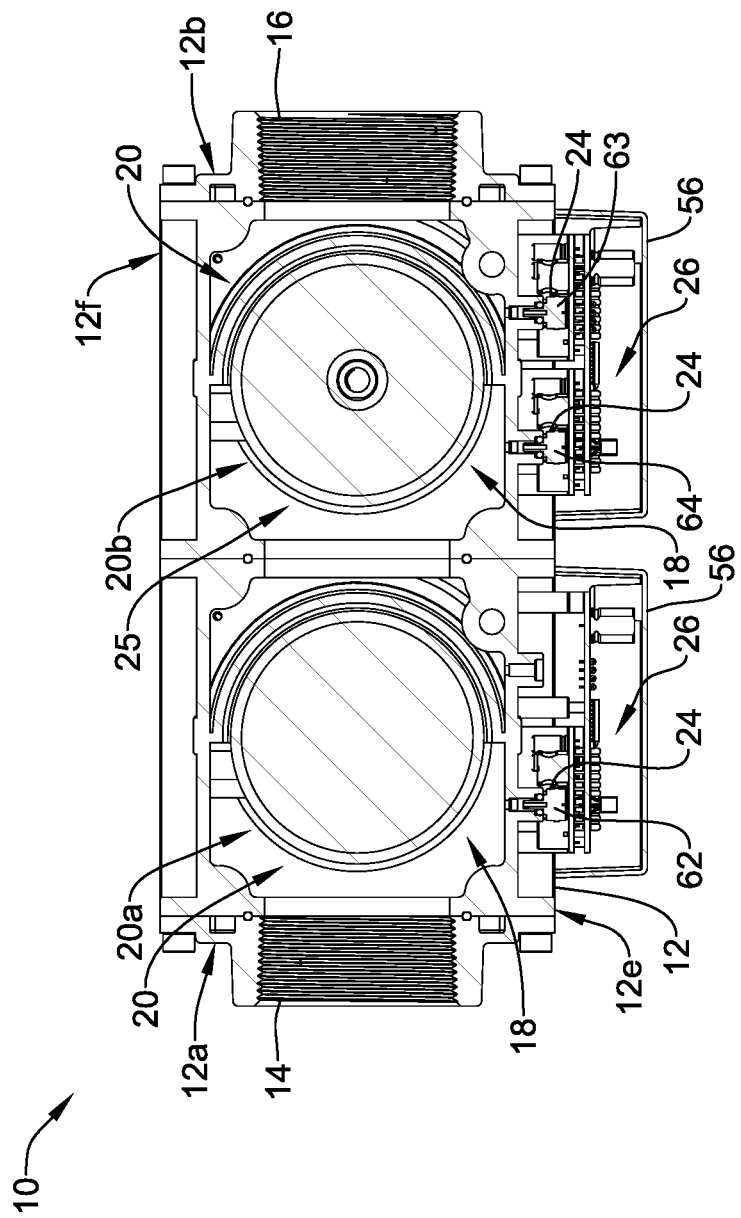
FIG. 7 is a cross-sectional view of the illustrative gas valve assembly of FIG. 2, taken along line 7-7 of FIG. 3.

The illustrative valve body 12 may include an inlet port 14, an outlet port 16 and a fluid path or fluid channel 18 extending between the inlet port 14 and the outlet port 16. Further, the valve body 12 may include one or more gas valve ports 20 (e.g., a first valve port 20a and a second valve port 20b, shown in FIG. 7) positioned or situated in the fluid channel 18, one or more fuel or gas valve member(s) (sometimes referred to as valve sealing member(s)) moveable within the gas valve ports 20 (e.g., a first valve sealing member within the first valve port 20a and a second valve sealing member within the second valve port 20b, though not explicitly shown), one or more pressure sensor assemblies 24 (e.g., pressure sensors 62, 63, 64, as shown in FIG. 7 for example), one or more position sensors (not explicitly shown), and/or one or more valve controllers 26 (as shown in FIG. 7, for example) affixed relative to or coupled to the valve body 12 and/or in electrical communication (e.g., through a wired or wireless connection) with pressure sensor assemblies 24, position sensor(s), and/or gas valve members.

The valve assembly 10 may further include one or more actuators for operating moving parts therein. For example, valve assembly 10 may have actuators including, but not limited to, one or more stepper motors 94 (shown as extending downward from the bottom 12d of valve body 12 in FIG. 2), one or more solenoids 96 (shown as extending upward from the top 12c of valve body 12 in FIG. 2), and one or more servo valves 98 (a servo valve 98 is shown as extending upward from the top 12c of valve body 12 in FIGS. 2 and 3, where a second servo valve has been omitted), where the servo valve 98 may be a 3-way auto-servo valve or may be any other type of servo valve. In one illustrative embodiment, the one or more solenoids 96 may control whether the one or more gas valve ports 20 are opened or closed. The one or more stepper motors 94 may determine the opening size of the gas valve ports 20 when the corresponding gas valve sealing member is opened by the corresponding solenoid 96. In some cases, the one or more stepper motors 94 may not be provided when, for example, the valve assembly 10 is not a "modulating" valve that allows more than one selectable flow rate to flow through the valve when the valve is opened. The one or more actuators and/or motors 94, 96, 98 may be in electrical communication (e.g., through a wired or wireless connection) with the one or more valve controllers 26.

Figure 3:
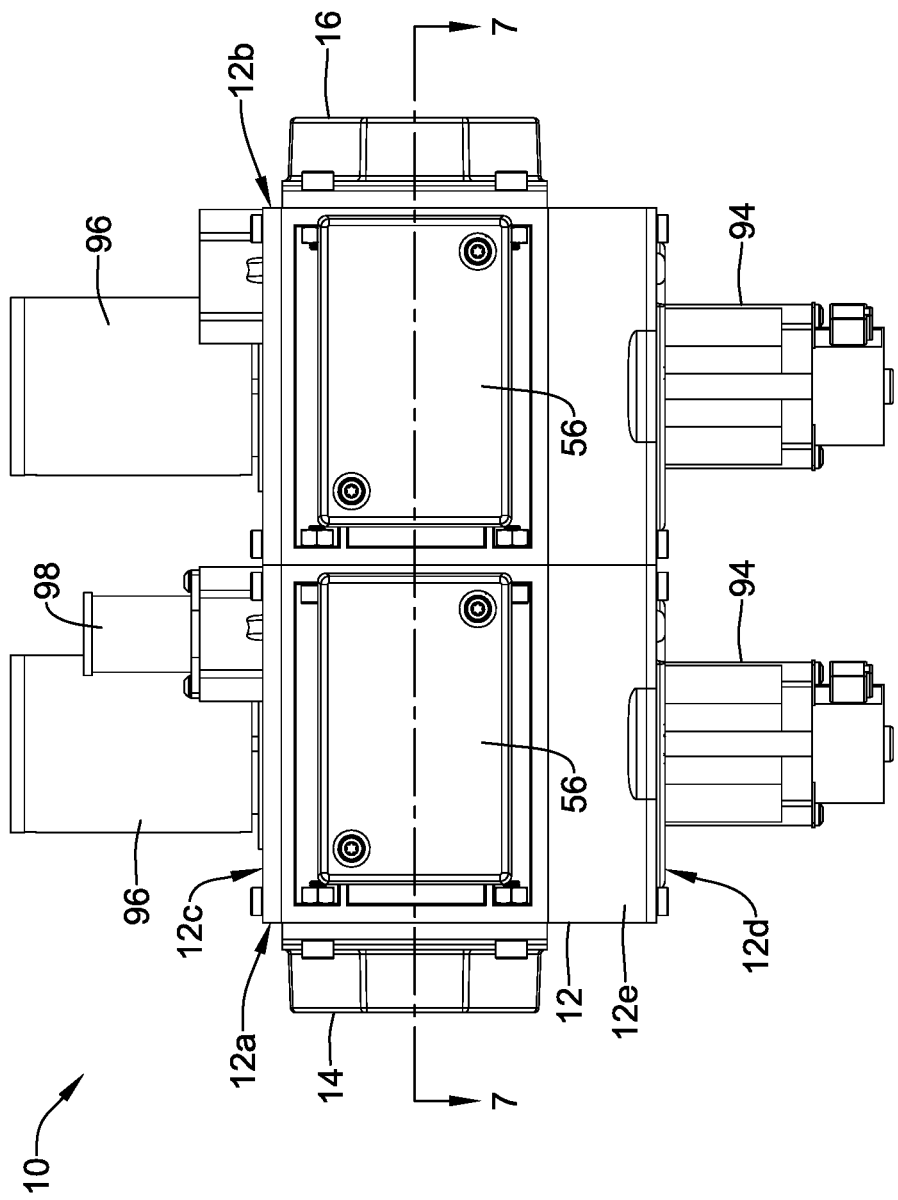
FIG. 3 is a schematic side view of the illustrative gas valve assembly of FIG. 2.

As shown, the valve body 12 may include one or more sensor and electronics compartments 56, which in the illustrative embodiment, extend from the back side 12e as depicted in FIGS. 2 and 3. The sensor and electronics compartments 56 may be coupled to or may be formed integrally with the valve body 12, and may enclose and/or contain at least a portion of the valve controllers 26, pressure sensor assemblies 24 and/or electronics required for operation of valve assembly 10 as described herein. Although the compartments 56 may be illustratively depicted as separate structures, the compartments 56 may be a single structure part of, extending from, and/or coupled to the valve body 12.

Figure 4:
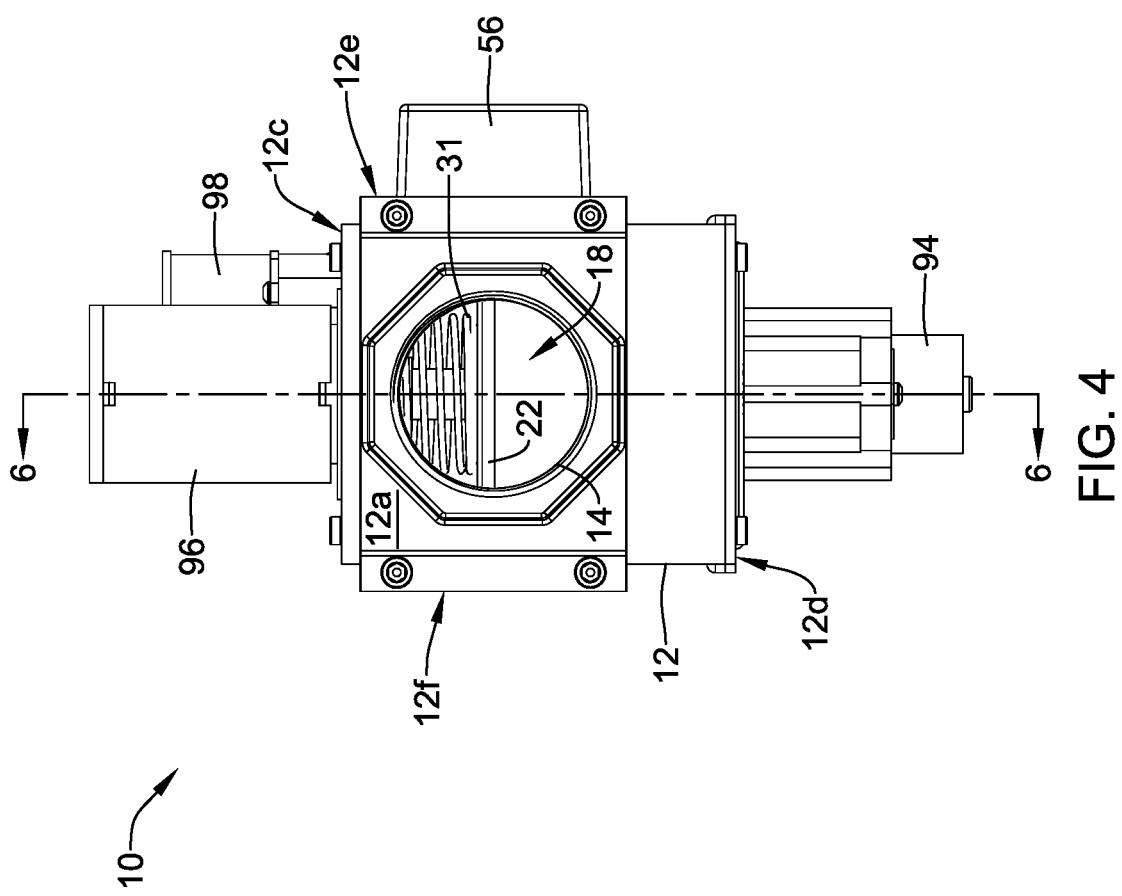
FIG. 4 is a schematic side of the inlet port side of the illustrative gas valve assembly of FIG. 2.

FIG. 4 illustrates the inlet port side of the of the illustrative valve assembly 10 and shows the first end 12a of the valve body 12. Through the valve inlet port 14, it can be seen from FIG. 4 that the valve assembly 10 may include one or more valve sealing members 22 positionable within the fluid channel 18 in response to a force applied by a spring 31. The sealing member 22 may be positionable in one or more other suitable manner, as desired.

Figure 5:
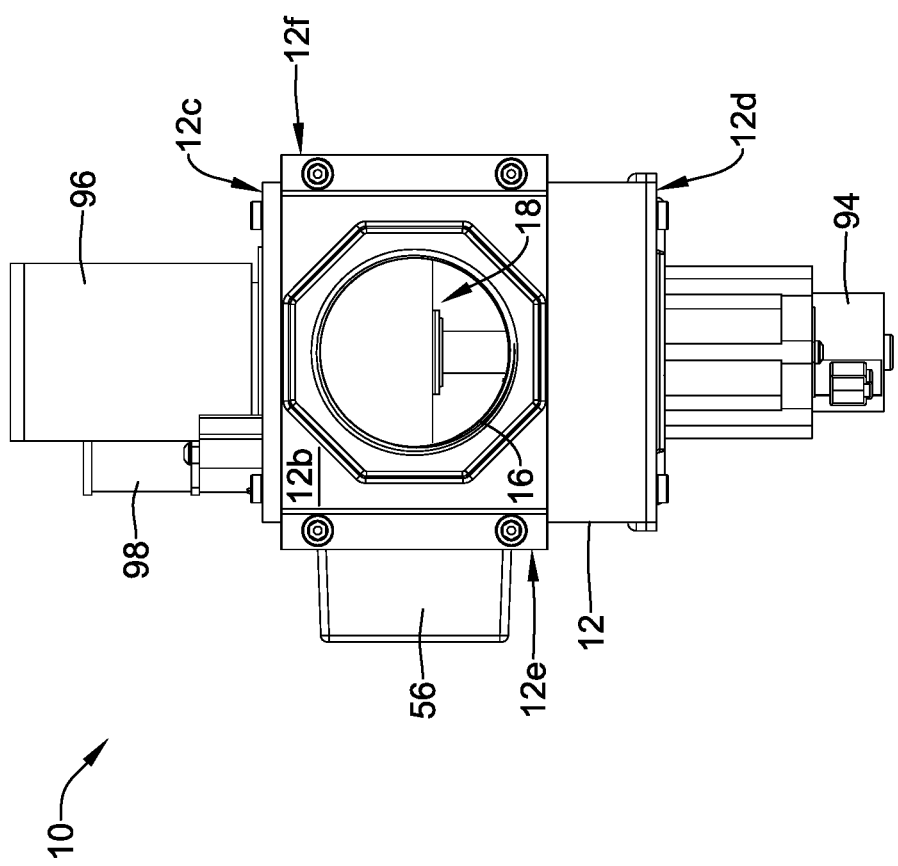
FIG. 5 is a schematic side view of the outlet port side of the illustrative gas valve assembly of FIG. 2.
Figure 6:
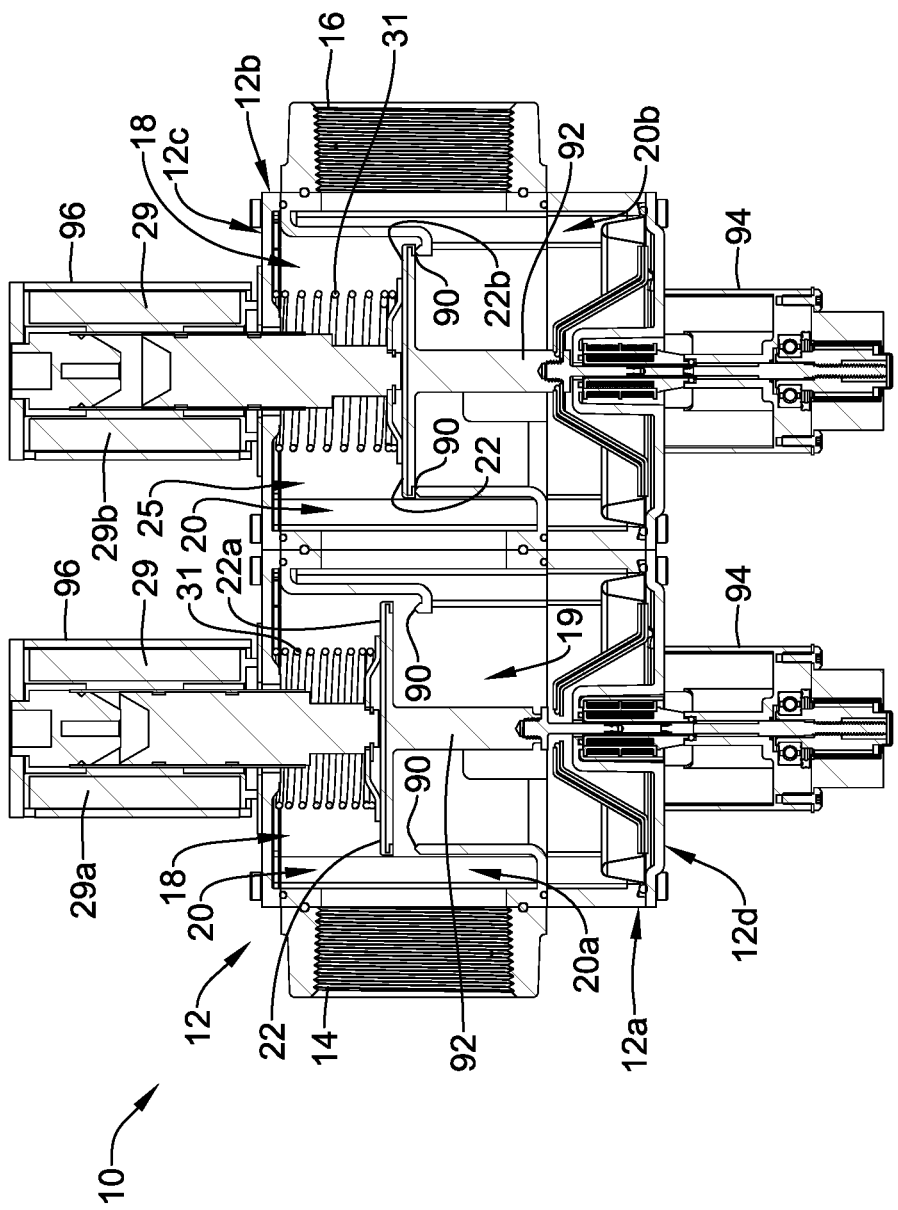
FIG. 6 is a schematic cross-sectional view of the illustrative gas valve assembly of FIG. 2, taken along line 6-6 of FIG. 4.

FIG. 5 illustrates the outlet port side of view of the illustrative valve assembly 10 and shows the second end 12b of the valve body 12. Through the valve outlet port 16, the fluid channel 18 may be viewed. FIG. 6 illustrates a cross-sectional view of the illustrative valve assembly taken at line 6-6 of FIG. 4, and FIG. 7 illustrates a cross-sectional view of the illustrative valve assembly 10 taken at line 7-7 of FIG. 3. In the illustrative embodiment, the one or more fluid valve ports 20 may include a first gas valve port 20a and a second gas valve port 20b situated along and/or in communication with the fluid channel 18, with an intermediate volume 25 therebetween. This is a double-blocking valve design. Within each gas valve port 20, a corresponding gas valve sealing member 22 (e.g., a first gas valve sealing member 22a in the first gas valve port 20a and a second gas valve sealing member 22b in the second gas valve port 20b, as depicted in FIG. 6) may be situated in the fluid channel 18 and may be positioned (e.g., concentrically or otherwise) about an axis, rotatable about the axis, longitudinally and axially translatable, rotationally translatable, and/or otherwise selectively movable between a first position (e.g., an opened or closed position) and a second position (e.g., a closed or opened position) within the corresponding valve port 20. Movement of the valve sealing member(s) 22 may open and close the valve port 20.

It is contemplated that the valve sealing member 22 may include one or more of a valve disk, a valve stem 92, and/or valve seal for sealing against a valve seat 90 situated in the fluid channel 18, as depicted in FIG. 6, and/or other similar or dissimilar components facilitating a seal. Alternatively, or in addition, the valve sealing member 22 may include structural features and/or components of a gate valve, a disk-on-seat valve, a ball valve, a butterfly valve and/or any other type of valve configured to operate from a closed position to an opened position and back to a closed position. An open position of a valve sealing member 22 may be any position that allows fluid to flow through the respective gas valve port 20 in which the valve sealing member 22 is situated, and a closed position may be when the valve sealing member 22 forms at least a partial seal at the respective valve port 20. The valve sealing member 22 may be operated through any technique. For example, the valve sealing member 22 may be operated through utilizing a spring 31, an actuator 29 to effect movement against the spring 31, and, in some cases, a position sensor to sense a position of the valve sealing member 22.

The valve actuator(s) 29 may be any type of actuator configured to operate the valve sealing member 22 by actuating the valve sealing member 22 from the closed position to an opened position and then back to the closed position during each of a plurality of operation cycles during a lifetime of the gas valve assembly 10 or of the actuator 29. In some cases, the valve actuator 29 may be a solenoid actuator (e.g., a first valve actuator 29a and a second valve actuator 29a), a hydraulic actuator, magnetic actuators, electric motors, pneumatic actuators, and/or other similar or different types of actuators, as desired. In the example shown in FIG. 6, valve actuators 29a, 29b may be configured to selectively move valves or valve sealing members 22a, 22b of valve ports 20a, 20b between a closed position, which closes the fluid channel 18 between the inlet port 14 and the outlet port 16 of the valve body 12, and an opened position.

The valve assembly 10 may include a characterized port defined between the inlet port 14 and the outlet port 16. A characterized port may be any port (e.g., a fluid valve port 20 or other port or restriction through which the fluid channel 18 may travel) at or across which an analysis may be performed on a fluid flowing therethrough. For example, if a flow resistance of a valve port 20 is known over a range of travel of the valve sealing member 22, the one of the one or more gas valve ports 20 may be considered the characterized port. As such, and in some cases, the characterized port may be a port 20 having the valve sealing member 22 configured to be in an opened position and/or in a closed position. Alternatively, or in addition, a characterized port may not correspond to a gas valve port 20 having a valve sealing member 22. Rather, the characterized port may be any constriction or feature across which a pressure drop may be measured and/or a flow rate may be determined.

The illustrative gas valve assembly 10 of FIGS. 2-7 is an example of a gas safety shutoff valve, or double-block valve. In some cases, however, it is contemplated that the gas valve assembly 10 may have a single valve sealing member 22, or three or more valve sealing members 22 in series or parallel, as desired.

Figure 8:
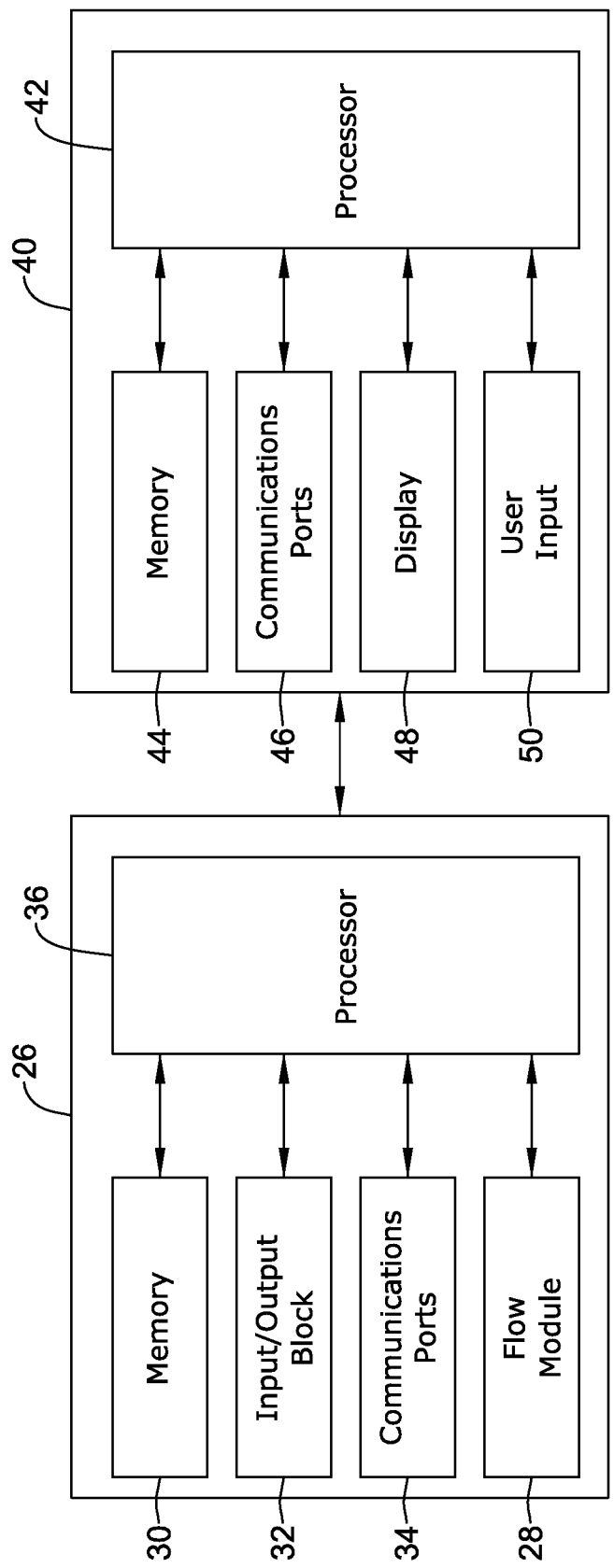
FIG. 8 is a schematic block diagram of an illustrative valve controller in communication with an illustrative external device.

The gas valve assembly 10 may include and/or may otherwise be in communication with a flow module 28 (see, for example, the flow module 28 shown as part of the valve controller 26 in FIG. 8) for sensing one or more parameters of a fluid flowing through fluid channel 18, and in some cases, determining a measure related to a gas flow rate of the fluid flowing through the fluid channel 18. In some instances, the flow module 28 may include a pressure block or pressure sensor assembly (e.g., the pressure sensor assembly 24 discussed herein and/or other suitable pressure sensor assemblies), a temperature sensor, a valve member position sensor, and/or the valve controller 26, among other assemblies, sensors and systems for sensing, monitoring and/or analyzing parameters of a fluid flowing through fluid channel 18. The flow module 28 may be a part of the valve controller 26, as shown in FIG. 8, and/or otherwise, may be in communication with the valve controller 26.

It is contemplated that the flow module 28 may utilize any type of sensor to facilitate determining a measure related to a flow rate of a fluid through the fluid channel 18, such as a pressure sensor, a flow sensor, a valve position sensor, and/or other suitable type of sensor, as desired. In one example, the valve controller 26 may be configured to monitor a differential pressure across a characterized port based on measures from the flow module 28, and in some cases, a position of one or more valve sealing members 22 of the gas valve assembly 10. The information from monitoring may be utilized by the flow module 28 to determine and monitor the flow rate of fluid (e.g., liquid or gas) passing through the fluid channel 18. In some cases, the valve controller 26 may determine a measure that is related to a gas flow rate through the fluid channel 18 based, at least in part, on the measure that is related to the pressure drop across the characterized port along with a pre-stored relationship in the memory 30 between the pressure drop and gas flow rates. The memory 30 may be a part of the valve controller 26 and/or more specifically part of the flow module 28, as desired.

The valve controller 26 may be configured to determine a relationship between a desired burner load or firing rate and the measure related to a gas flow rate based, at least in part, on a previously established relationship stored in the memory 30. In some cases, the previously established relationship may include A/F ratio versus burner load curve and/or A/F ratio look up tables for desired burner loads or firing rates.

The different relationships described herein may be generated during installation and/or calibration of the valve assembly 10, and may be stored as data tables or curves in the memory 30. Using the previously established relationship(s) between flow rate and burner load or firing rate and a burner load control signal or command received at the valve assembly 10 from another device (e.g. building controller, system level controller or combustion appliance controller) within the system, the valve controller 26 may be configured to adjust a measure of fuel flow through the valve assembly 10 to achieve a desired A/F ratio. Alternatively or in addition, the valve controller 26 may be configured to adjust an A/F ratio in real time for received burner load control signals or commands received at the valve assembly 10 in real time based on feedback or measures received from a sensor sensing combustion constituents exiting a combustion chamber of a combustion appliance.

It is contemplated that the valve controller 26 (see, FIG. 7) may be physically secured or coupled to, or secured or coupled relative to, valve body 12. The valve controller 26 may be configured to control and/or monitor a position or state (e.g., an open position and a closed position) of the valve sealing members 22 of the valve ports 20 and/or to perform other functions and analyses, as desired. In some cases, the valve controller 26 may be configured to close or open gas valve member(s) or valve sealing member(s) 22 on its own volition, in response to control signals or commands from other systems or appliances (e.g., a system level controller, central building controller, or combustion appliance controller), and/or in response to received measures related to sensed parameters (e.g., sensed pressures upstream, intermediate, and/or downstream of the characterized valve port(s), sensed differential pressures across the characterized valve port(s), temperature sensed upstream, intermediate, and/or downstream of the characterized valve port(s), sensed combustion constituents in exhaust, and/or in response to other measures, as desired). In one example, the valve controller 26 may be configured to close or open gas valve member(s) or the valve sealing member(s) 22 in response to determining or receiving a burner load (e.g. firing rate) control signal or command from a system or building level controller or an appliance controller (e.g. burner controller) to control a rate of flow of gas through the valve assembly 10 and to a connected appliance to achieve a desired A/F ratio for the commanded burner load.

The memory 30, which in some cases may be part of valve controller 26, may be configured to record data related to sensed pressures, sensed differential pressures, sensed temperatures, and/or other measures sensed by sensors of the flow module 28 and/or other suitable sensors. The valve controller 26 may access this data, and in some cases, communicate (e.g., through a wired or wireless communication link) the data and/or analyses of the data to other systems (e.g., a system level or central building control). The memory 30 and/or other memory may be programmed and/or developed to contain software to affect one or more of the configurations described herein.

FIG. 8 is a schematic block diagram of an illustrative valve controller 26 in communication with a separate device 40. The illustrative valve controller 26 may include a processor or controller 36 (e.g., microcontroller and/or other suitable processor or controller). The processor or controller 36 may include or implement a proportional-integral-derivative (PID) controller, but this is not required. Other control configurations are contemplated. The valve controller 26 may be adapted or configured to operate in accordance with an algorithm that controls or at least partially controls portions of the valve assembly 10. The valve controller 26 may include the memory 30 that may be considered as being electrically connected to the processor 36. The memory 30 may be used to store any desired information, such as control algorithm, set points, A/F ratio versus burner load firing rate tables or curves, and the like. The processor 36 may store information within memory 30 and may subsequently retrieved the stored information. The memory 30 may be any suitable type of storage device, such as RAM, ROM, EPROM, a flash drive, a hard drive, and the like. Further, although not depicted in FIG. 8, the valve controller 26 may include a user interface having display and/or user input features.

The valve controller 26 may include an input/output block (I/O block) 32 having a number of wire terminals for receiving one or more wires from the valve assembly 10 and/or combustion appliance. While the term I/O may imply both input and output, it is intended to include input only, output only, as well as both input and output. The I/O block 32 may be used to communicate one or more signals (e.g., one or more digital signals and/or one or more analog signals) to and/or from the valve assembly 10 and/or combustion appliance. The valve controller 26 may have any number of wire terminals for accepting connections from the valve assembly 10 and/or combustion appliance. How many and which of the wire terminals are actually used at a particular installation may depend on the particular configuration of the valve assembly 10 and/or combustion appliance.

In some cases, as illustrated, the valve controller 26 may include a communications or data port 34. The communications ports 34 may be configured to communicate with the processor 36 and/or the I/O block 32 and may, if desired, be used to upload information to the processor 36, download information from the processor 36, provide commands to the processor 36, send commands from the processor 36, and/or perform any other suitable task. The communication port 34 may be a wireless port such as a Bluetooth™ port or any other wireless protocol. In some cases, communication port 34 may be a wired port such as a serial port, a parallel port, a CAT5 port, a USB (universal serial bus) port, or the like. In some instances, the communication port 34 may be a USB port and may be used to download and/or upload information from a USB flash drive. Other storage devices may also be employed, as desired, and may be in communication with the processor 36 through the communications port 34.

The separate device 40 may be in communication with the processor 36 of the valve controller 26 through the communications port 34 or other suitable connection to facilitate calibration procedures and/or programming of the valve controller 26. The valve controller 26 may be in wired or wireless communication with the separate device 40. The separate device 40 may be a computing device separate from the valve assembly 10. For example, the separate device 40 may be a human-machine interface (HMI) such as a personal computer, tablet computer, smart phone, laptop computer, or other suitable computing device as desired.

In some cases, the separate device 40 may not be a part of the valve assembly 10 or combustion appliance. For example, the separate device 40 may be a portable device which travels with the installer. The separate device 40 may be adapted or configured to facilitate programming the valve assembly 10 (e.g., generate A/F ratios for a particular valve assembly 10 and each burner rate or firing rate of a combustion appliance) via a set up wizard or software program. The separate device 40 may include a processor 42 and memory 44 connected to the processor 42. The memory 44 may be used to store any desired information, such as the aforementioned setup wizard, software programs, set points, and the like. The processor 42 may store information within memory 44 and may subsequently retrieve the stored information. The memory 44 may be any suitable type of storage device, such as RAM, ROM, EPROM, a flash drive, a hard drive, and the like.

In some cases, as illustrated, the separate device 40 may include a communications or data port 46. The communication ports 46 may be configured to communicate with the processor 42 and may, if desired, be used to either upload information to the processor 42, download information from the processor 42, provide commands to the processor 36, send commands from the processor 36, and/or perform any other suitable task. The communications port 46 may be a wireless port such as a Bluetooth™ port or any other wireless protocol. In some cases, communication port 46 may be a wired port such as a serial port, a parallel port, a CAT5 port, a USB (universal serial bus) port, or the like. In some instances, the communication port 46 may be a USB port and may be used to download and/or upload information from a USB flash drive. Other storage devices may also be employed, as desired. In some cases, the separate device 40 may be in communication with the processor 36 of the valve controller 26 to facilitate programming procedures and/or other suitable procedures as desired.

The separate device 40 may include a display 48. The display 48 may be part of a personal computer, tablet computer, smart phone, laptop computer, and/or may include a standalone display. In some instances, the separate device 40 may include a user input 50 for receiving a user input from a user. For example, the user input may include a keyboard, mouse, actuatable buttons, a touchscreen display, and/or other user input mechanism. These are just examples.

Figure 9:
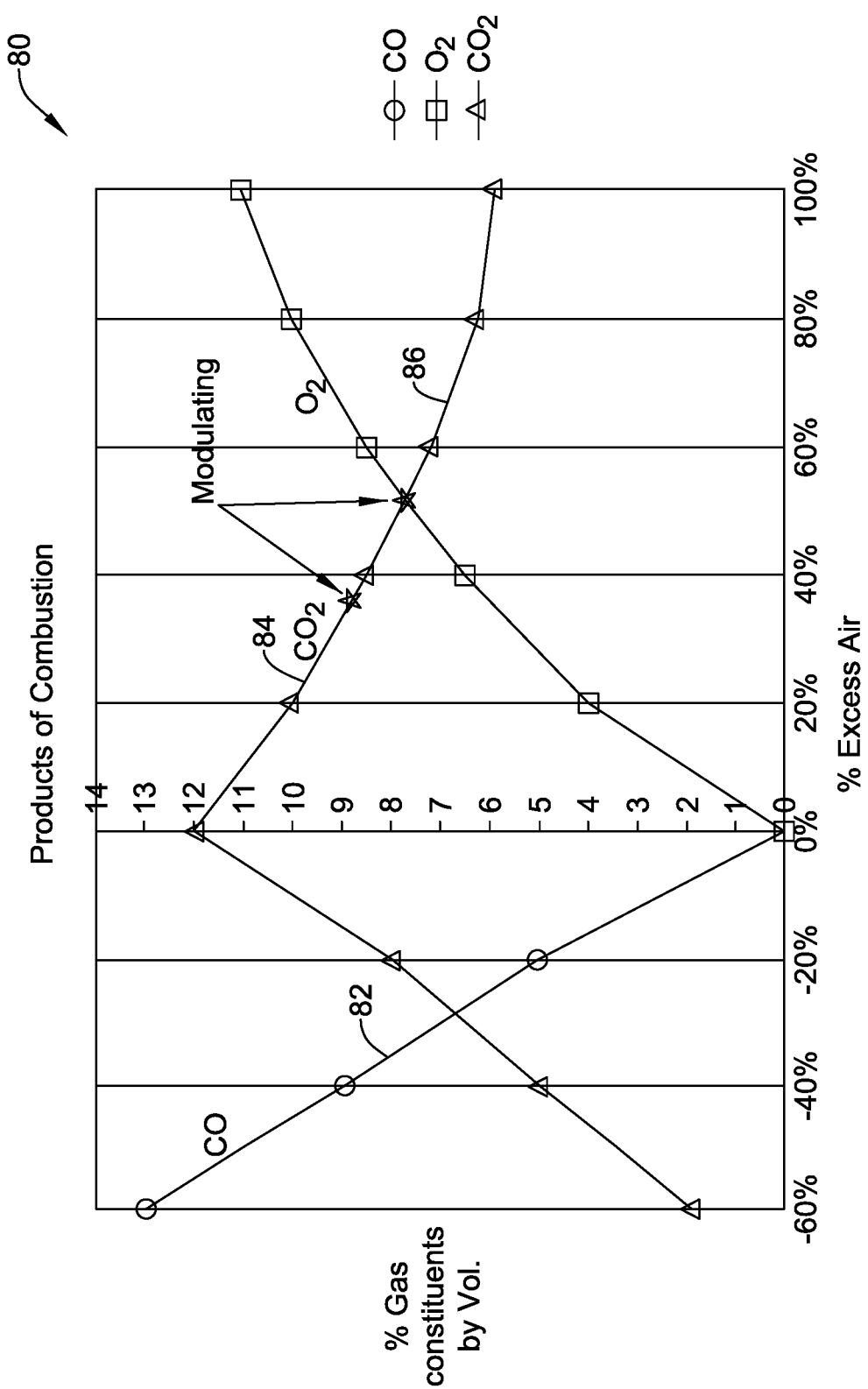
FIG. 9 is a graph of illustrative combustion constituents in exhaust of a combustion reaction.

FIG. 9 depicts a graph 80 of illustrative combustion constituents in exhaust from a combustion appliance as a function of excess air in the exhaust. Although there are a variety of gas constituents in exhaust of a combustion appliance, the graph depicted in FIG. 9 focuses on carbon monoxide (CO) 82, carbon dioxide ($CO_2$) 84, and oxygen ($O_2$) 86. As can be seen in FIG. 9, at least theoretically, when there is no excess air in the combustion process, the constituents of the product of combustion may include CO 82 and $CO_2$ 84, and when there is excess air in the combustion process, the constituents of the product of combustion may include $O_2$ 86 and $CO_2$ 84. Although in theory there is no CO 82 present in the product of combustion when there is excess air, some CO 82 may exist in the product of combustion when there is excess air.

In some cases, the slope of the $CO_2$ 84 may indicate whether more or less air is needed in a combustion chamber of the combustion appliance. For example, as shown in FIG. 9, if the slope of the $CO_2$ 84 line is positive, CO 82 is expected to be present and it may be determined more air is needed such that $O_2$ 86 may react with the CO 82 to form $CO_2$ 84. Further, as shown in FIG. 9, if the slope of the $CO_2$ 84 line is negative, it may be determined that the product of combustion does not include an unsafe amount of CO 82. As a result, based on the interaction between CO 82, $CO_2$ 84, and $O_2$ 86 and/or other factors, it is possible to adjust an air-fuel ratio of fluid flowing to a combustion chamber to meet a combustion constituent set point for the exhaust or product output of the combustion appliance.

Figure 10:
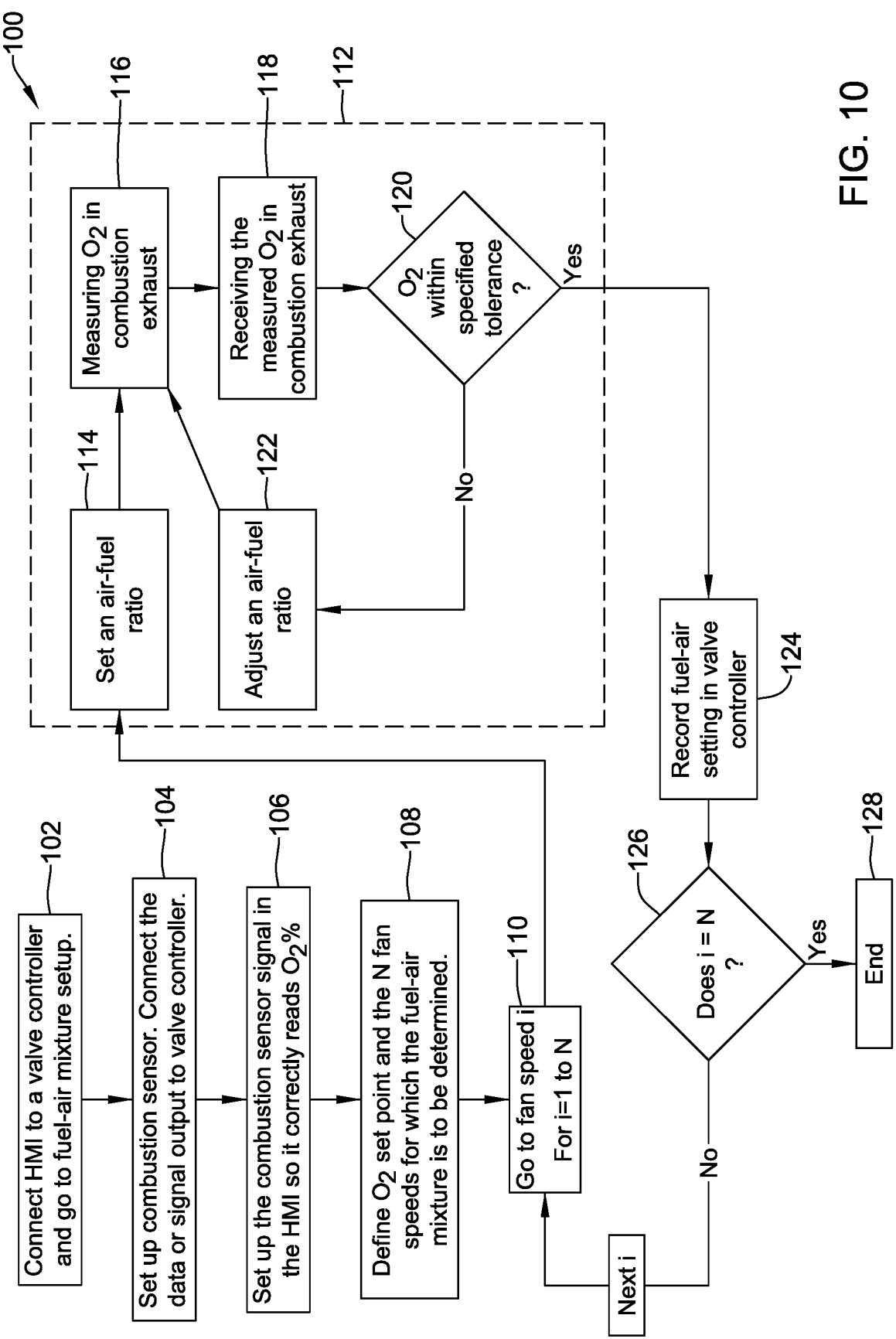
FIG. 10 is a schematic flow diagram depicting an illustrative air-fuel ratio programming procedure based on oxygen content in an exhaust from a combustion appliance.
Figure 11:
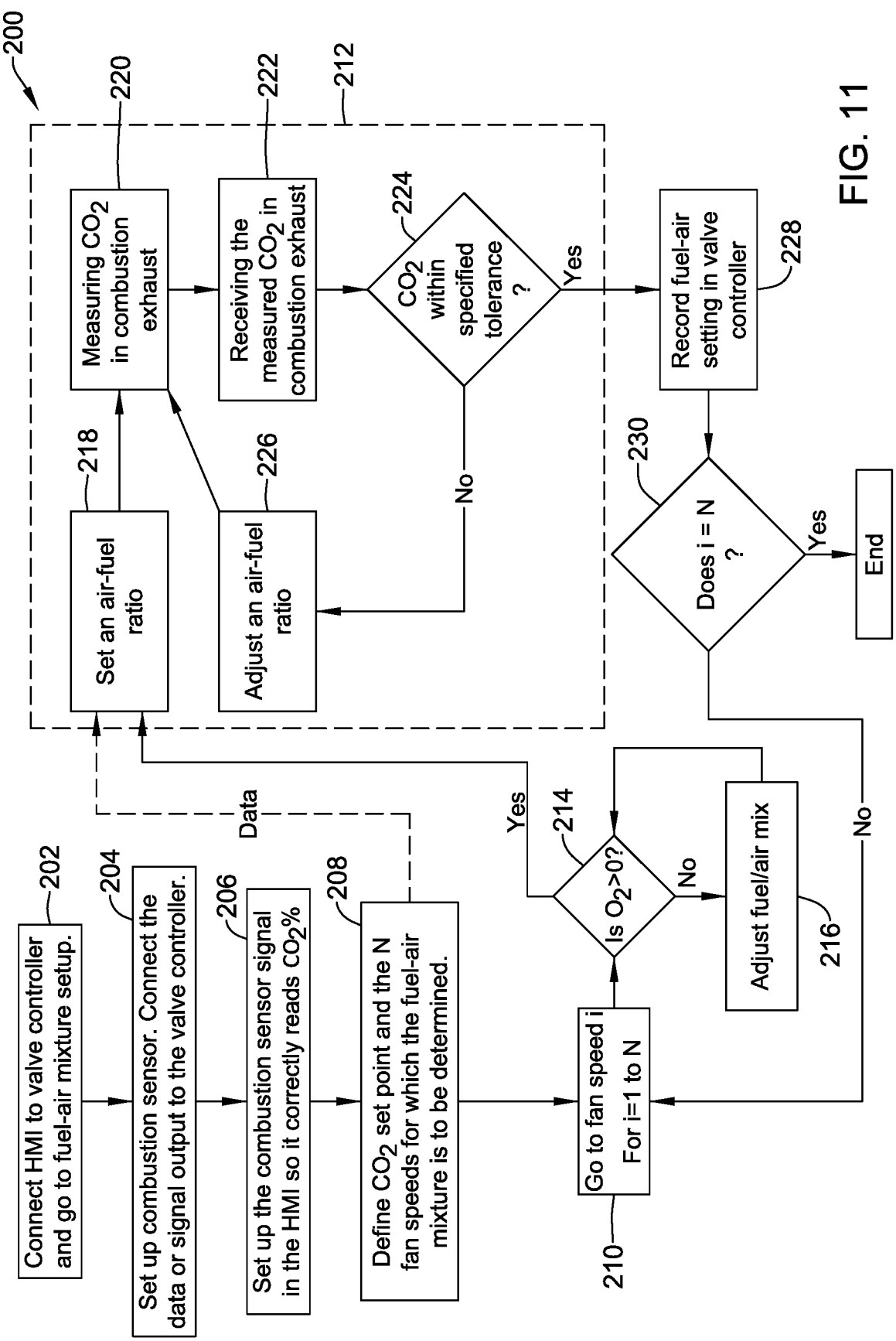
FIG. 11 is a schematic flow diagram depicting an illustrative air-fuel ratio programming procedure based on carbon dioxide content in an exhaust from a combustion appliance.

FIGS. 10 and 11 depict flow diagrams of illustrative techniques for programming a valve controller (e.g., the valve controller 26 or other suitable valve controller) to provide predetermined air-fuel ratios in a flow of fluid to a combustion chamber at different burner firing rates (e.g., at different fan speeds). Programming of the valve controller may occur at a time of setting up the valve controller at a burner control system and/or at one or more other suitable times. Programming of a valve controller may occur at a site location for a burner control system to account for local pressures, local temperatures, equipment type, and/or other conditions, but this is not required.

At least some of the techniques depicted in FIGS. 10 and 11 may be automated using the valve controller and/or one or more other components of a burner control system (e.g., the burner control system 2 or other suitable burner control system). In some cases, the techniques of FIGS. 10 and 11 may utilize one or more components in communication with the valve controller. For example, a human-machine interface (HMI) (e.g., the HMI 23 or other suitable HMI) may be in communication with the valve controller and may be configured to program the valve controller automatically or in response to user input by associating and saving air-fuel ratio set points for specified burner firing rates in the valve controller or in another suitable location in communication with the valve controller. Alternatively, or in addition, the valve controller may be configured to program itself automatically, in response to user input, and/or in response to a trigger without the use of an HMI. The HMI, when included, and the valve controller may be referred to as a controller herein even though the HMI and the valve controller may be configured as a single component or separate components.

The techniques of FIGS. 10 and 11 may utilize one or more sensors for sensing combustion constituents in an exhaust from the combustion chamber (e.g., the combustion sensor 13 or other suitable sensors) that are in communication with the valve controller. In some cases, the burner control system may include a combustion sensor and in other cases, the burner control system may not include a combustion sensor. When a combustion sensor is not included in the burner control system, a combustion sensor may be placed in the exhaust from the combustion chamber and communicatively connected to the valve controller and/or the HMI to provide measurements of the combustion constituents at each burner firing rate and/or each air-fuel ratio.

The programming techniques depicted in FIGS. 10 and 11 may provide for automated closed-loop programming of the valve controller. For example, each of the techniques may include determining or otherwise establishing an air-fuel ratio setting for a burner firing rate, receiving a measure of one or more combustion constituents exiting the combustion chamber at the air-fuel ratio setting and burner firing rate, determining a difference between the received measure of one or more combustion constituents and a set point for the one or more combustion constituents, adjusting the air-fuel ratio for the burner firing rate until a difference between the received measure of the one or more combustion constituents and the set point for the one or more combustion constituents is below a threshold, and then saving an association between the air-fuel ratio setting that results in received measures below the threshold and the burner firing rate. This process may be automatically or otherwise repeated for each of two or more possible burner firing rates. In some cases, the process may be automatically or otherwise repeated for all possible burner firing rates of the combustion appliance.

FIG. 10 depicts an illustrative method 100 of closed loop air-fuel ratio programming based on an amount of oxygen (e.g., a combustion constituent) in the exhaust from the combustion chamber. When an HMI is to be used in addition to the valve controller, the HMI may be connected 102 to the valve controller and the software of the HMI may proceed to an air-fuel ratio setup. The HMI may proceed to the air-fuel ratio setup automatically upon being connected to the valve controller and/or upon receiving user input.

A combustion sensor may be setup and connected 104 to the HMI and/or the valve controller. When the combustion sensor is not a permanent part of the burner control system, the combustion sensor may be attached to and/or placed in a flue extending from the combustion chamber and connected to or otherwise placed in communication with the HMI and/or the valve controller. Although the combustion sensor may be configured to sense an oxygen content in the flue, the combustion sensor may be configured to sense one or more other constituent contents in the flue. The combustion sensor may be a single sensor or multiple sensors Once the HMI and the combustion sensors are connected, as needed, the HMI and/or the valve controller may set up 106 the combustion sensor to ensure it is correctly measuring oxygen. In one example, the HMI and/or the valve controller may run a calibration procedure to ensure the combustion sensor is properly sensing oxygen. Although other calibration procedures may be utilized, one example calibration procedure may compare: (1) a measure of oxygen received from the combustion sensor when air is being blown through the combustion chamber while the combustion appliance is not firing; to (2) an expected oxygen content in air (e.g., 20.95% oxygen plus or minus a tolerance relative to the other constituents of air) and adjust a sensitivity and/or offset of the sensor, as needed.

An oxygen set point in exhaust from a combustion chamber at specified burner firing rates for which air-fuel ratios are to be determined may be defined 108. The oxygen set point for the exhaust from the combustion chamber may be set by a user when setting up the HMI or valve controller for programming and/or may be pre-determined by an original equipment manufacturer. In some cases, the oxygen set point may be associated with one or more safety regulations as the presence of oxygen in the exhaust may reduce an amount of carbon monoxide in the exhaust from the combustion chamber.

The burner firing rates for which an air-fuel ratio may be determined may be any set of burner firing rates at which the burner control system may be configured to fire. In some cases, the burner firing rates for which an air-fuel ratio may be determined may be a sub-set of all of the burner firing rates at which the burner control system may be configured to fire. Alternatively, the burner firing rates for which an air-fuel ratio may be determined may be all of the burner firing rates at which the burner controller system may be configured to fire. Example burner firing rates may be percentages of a maximum burner firing rate, a fan speed at a percentage of a maximum of burner firing rates, and/or one or more other values related to a burner firing.

Once the oxygen set point and the burner firing rates at which air-fuel ratios are to be determined have been established, an automated feedback loop portion 112 of the method 100 may be initiated at a particular burner firing rate by going 110 to the first burner firing rate (e.g., burner firing rate, with i=1, where i goes from 1 to N). The automated feedback loop 112 may include setting 114 an air-fuel ratio for the burner firing rate$_i$, measuring 116 an oxygen content in exhaust from the combustion chamber with the combustion sensor, and receiving 118 (e.g., via the input/output port 32 or other input/output interface) the measured oxygen in the combustion exhaust. In some cases, the air-fuel ratio setting may be achieved by adjusting a valve position of a gas valve assembly (e.g., the gas valve assembly 10 or other suitable gas valve assembly) to adjust a fuel flow through the gas valve assembly, as the flow of air may be established from the burner firing rate (e.g., a set fan speed may be associated with a burner firing rate).

The HMI and/or the valve controller may determine 120 whether the received measured oxygen in the combustion exhaust is within a specified tolerance relative to the defined or set oxygen set point for the exhaust from the combustion chamber. An example manner of determining whether the received measured oxygen content in the combustion exhaust is within a tolerance may include determining a difference between the measured oxygen content and the defined oxygen set point and then comparing the determined difference to a threshold value. If the determined difference is below the threshold, it may be determined the measured oxygen content is within a specified tolerance and if the determined difference has reached or gone beyond the threshold, it may be determined the measured oxygen content is not within a specified tolerance.

When the measured oxygen content is not within the predetermined tolerance, the HMI and/or the valve controller may be configured to adjust 122 the air-fuel ratio setting of the burner control system while staying at the specified burner firing rate. Then, steps 114-122 may be repeated at the specified burner firing rate until the measured oxygen content is within the predetermined tolerance. In some cases, the feedback loop 112 may time out and an alarm or other notification may be issued to indicate a measured oxygen content within the predetermined tolerances cannot be achieved at the specified burner firing rate.

When the measured oxygen content is within the predetermined tolerance, the air-fuel ratio setting may be associated with the burner firing rate and recorded or saved 124 in memory that is in communication with the valve controller. In some cases, the associated air-fuel ratio setting and burner firing rate may be saved in memory of the valve controller or the valve assembly. After recording or saving the air-fuel ratio setting and the burner firing rate, the method 100 may include determining 126 if an air-fuel ratio setting needs to be determined for any other burner firing rates.

When i does not equal N, it may be determined further air-fuel ratio settings need to be determined and the burner control system may adjust the burner firing rate to the next burner firing rate (e.g., burner firing rate$_{i+1}$). In some cases, air-fuel ratios may be established for burner firing rates in a sequential manner, but this is not required. When i does equal N, it may be determined no further burner firing rates need to have an associated air-fuel ratio setting established. As such, the method 100 may be ended 128 and the programming of the valve controller may be completed.

Once programming is completed, the burner control system may be configured to send a burner firing rate to the valve controller and the valve controller may be configured to adjust a valve of the valve assembly to achieve an air-fuel ratio associated with the received burner firing rate.

FIG. 11 depicts an illustrative method 200 of closed loop air-fuel ratio programming based on an amount of carbon dioxide (e.g., a combustion constituent) in the exhaust from the combustion chamber. When an HMI is to be used in addition to the valve controller, the HMI may be connected 202 to the valve controller and the software of the HMI may proceed to an air-fuel ratio setup. The HMI may proceed to the air-fuel ratio setup automatically upon being connected to the valve controller and/or upon receiving user input.

A combustion sensor may be setup and connected 204 to the HMI and/or the valve controller. When the combustion sensor is not a permanent part of the burner control system, the combustion sensor may be attached to and/or placed in a flue extending from the combustion chamber and connected to or otherwise placed in communication with the HMI and/or the valve controller. Although the combustion sensor may be configured to sense a carbon dioxide content in the flue, the combustion sensor may be configured to sense one or more other constituent contents in the flue. The combustion sensor may be a single sensor or multiple sensors Once the HMI and the combustion sensors are connected, as needed, the HMI and/or the valve controller may set up 206 the combustion sensor to ensure it is correctly measuring carbon dioxide, oxygen, and/or other exhaust constituents. In one example, the HMI and/or the valve controller may run a calibration procedure to ensure the combustion sensor is properly sensing carbon dioxide, oxygen and/or other exhaust constituents. Although other calibration procedures may be utilized, one example calibration procedure may compare: (1) a measure of carbon dioxide, oxygen, and/or other constituents received from the combustion sensor when air is being blown through the combustion chamber while the combustion appliance is not firing: to (2) an expected carbon dioxide, oxygen, and/or other constituent content in air (e.g., 0.04% carbon dioxide and/or 20.95% oxygen plus or minus a tolerance relative to the other constituents of air) and adjusts a sensitivity and/or offset of the sensor, as needed.

A carbon dioxide set point in exhaust from a combustion chamber at specified burner firing rates for which air-fuel ratios are to be determined may be defined 108. The carbon dioxide set point for the exhaust from the combustion chamber may be set by a user when setting up the HMI or valve controller for programming and/or may be pre-determined by an original equipment manufacturer. In some cases, the carbon dioxide set point may be associated with one or more safety regulations as a slope of carbon dioxide content in the exhaust may be indicative of whether carbon monoxide may be present in the exhaust from the combustion chamber.

As in method 100, the burner firing rates for which an air-fuel ratio may be determined may be any set of burner firing rates at which the burner control system may be configured to fire. In some cases, the burner firing rates for which an air-fuel ratio may be determined may be a sub-set of all of the burner firing rates at which the burner control system may be configured to fire. Alternatively, the burner firing rates for which an air-fuel ratio may be determined may be all of the burner firing rates at which the burner controller system may be configured to fire. Example burner firing rates may be percentages of a maximum burner firing rate, a fan speed at a percentage of a maximum of burner firing rate, and/or one or more other values related to a burner firing.

Once the carbon dioxide set point and the burner firing rates at which air-fuel ratios are to be determined have been established, the burner control system may initiate operating the combustion appliance at a first burner firing rate (e.g., burner firing rate, with i=1, where i goes from 1 to N). At each burner firing rate the HMI or valve controller may determine whether an oxygen content in the combustion exhaust is greater than zero (0) or other threshold. It may be important to determine 214 whether the oxygen content is above zero or other suitable threshold at an air-fuel ratio because if the oxygen content is not greater than zero or other suitable threshold, there may be carbon monoxide present in the exhaust from the combustion chamber. As such, if the oxygen content of the exhaust is not above zero or other suitable threshold, the air-fuel ratio may be adjusted 216 by increasing a ratio of air to fuel in the flow of fluid to the combustion chamber and it may be further determined 214 whether an oxygen content in the exhaust from the combustion chamber is greater than zero or other suitable threshold. This process may be repeated until the oxygen content in the exhaust is greater than zero or other suitable threshold.

Once the oxygen content of the exhaust has been determined to exceed zero or go beyond one or more other suitable thresholds, an automated feedback loop portion 212 of the method 200 may be initiated at the established burner firing rate. The automated feedback loop 212 may include setting 218 an air-fuel ratio for the burner firing rate$_i$, measuring 220 a carbon dioxide content in exhaust from the combustion chamber with the combustion sensor, and receiving 222 (e.g., via the input/output port 32 or other input/output interface) the measured carbon dioxide in the combustion exhaust. In some cases, the air-fuel ratio setting may be achieved by adjusting a valve position of a gas valve assembly (e.g., the gas valve assembly 10 or other suitable gas valve assembly) to adjust a fuel flow through the gas valve assembly, as the flow of air may be established from the burner firing rate (e.g., a set fan speed may be associated with a burner firing rate).

The HMI and/or the valve controller may determine 224 whether the received measured carbon dioxide in the combustion exhaust is within a specified tolerance relative to the defined or set carbon dioxide set point for the exhaust from the combustion chamber. An example manner of determining whether the received measured carbon dioxide content in the combustion exhaust is within a tolerance may include determining a difference between the measured carbon dioxide content and the defined carbon dioxide set point and then comparing the determined difference to a threshold value. If the determined difference is below the threshold, it may be determined the measured carbon dioxide content is within a specified tolerance and if the determined difference has reached or gone beyond the threshold, it may be determined the measured carbon dioxide content is not within a specified tolerance.

When the measured carbon dioxide content is not within the predetermined tolerance, the HMI and/or the valve controller may be configured to adjust 226 the air-fuel ratio setting of the burner control system while staying at the specified burner firing rate. Then, steps 220-226 may be repeated at the specified burner firing rate until the measured carbon dioxide content is within the predetermined tolerance. In some cases, the feedback loop 212 may time out and an alarm or other notification may be issued to indicate a measured carbon dioxide content within the predetermined tolerances cannot be achieved at the specified burner firing rate.

When the measured carbon dioxide content is within the predetermined tolerance, the air-fuel ratio setting may be associated with the burner firing rate and recorded or saved 228 in memory that is in communication with the valve controller. In some cases, the associated air-fuel ratio setting and burner firing rate may be saved in memory of the valve controller or the valve assembly, but this is not required. After recording or saving the air-fuel ratio setting and the burner firing rate, the method 200 may include determining 230 if an air-fuel ratio setting needs to be determined for any other burner firing rates.

When i does not equal N, it may be determined further air-fuel ratio settings need to be determined and the burner control system may adjust the burner firing rate to the next burner firing rate (e.g., burner firing rate$_{i+1}$. In some cases, air-fuel ratios may be established for burner firing rates in a sequential manner, but this is not required. When i does equal N, it may be determined no further burner firing rates need to have an associated air-fuel ratio setting established. As such, the method 200 may be ended 232 and the programming of the valve controller may be completed. Once programming is completed, the burner control system may be configured to send a burner firing rate to the valve controller and the valve controller may be configured to adjust a valve of the valve assembly to achieve an air-fuel ratio associated with the received burner firing rate.

Figure 12:
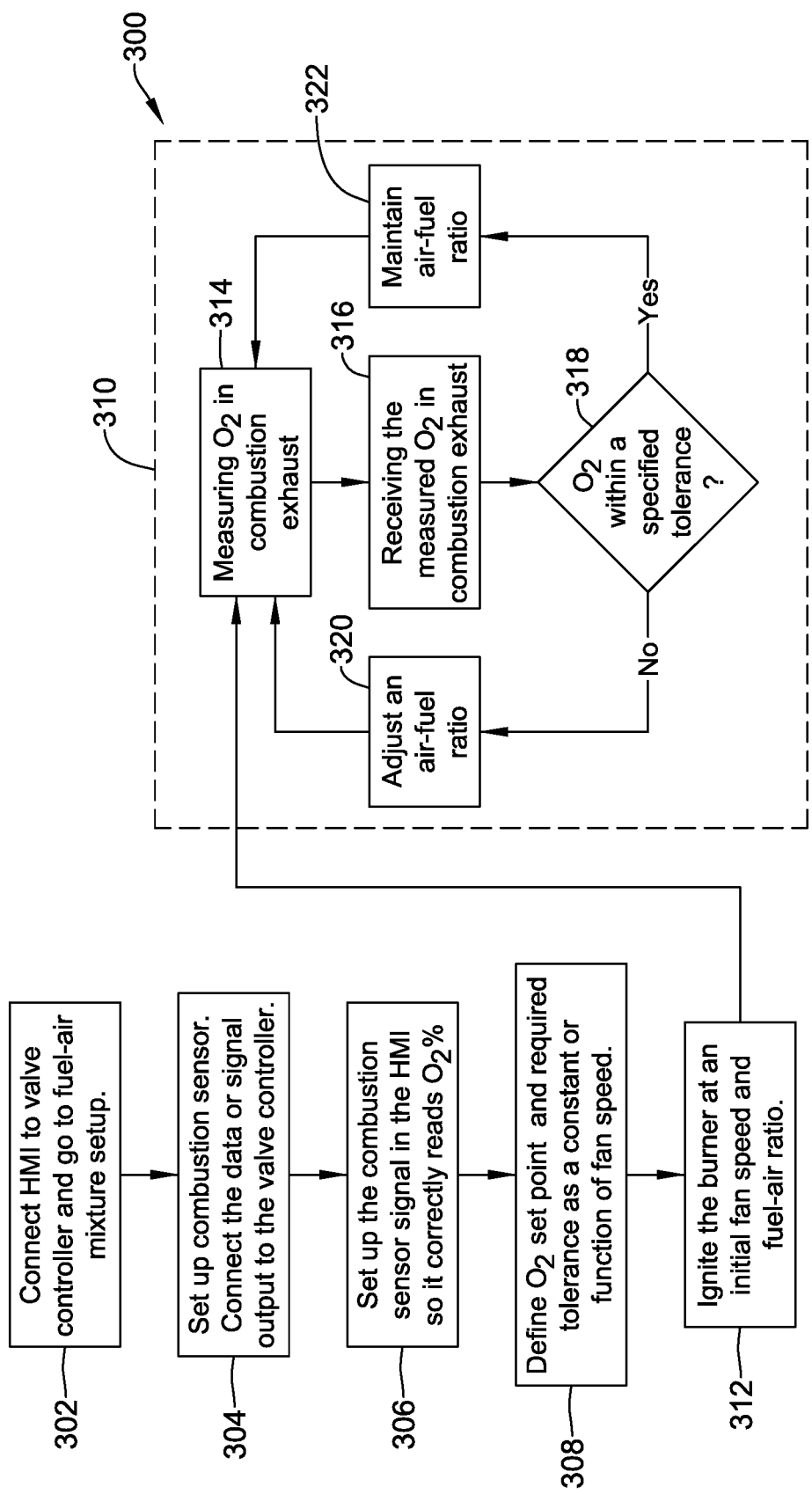
FIG. 12 is a schematic flow diagram depicting an illustrative closed-loop air-fuel ratio control procedure for a combustion appliance based on oxygen content in an exhaust from a combustion appliance.
Figure 13:
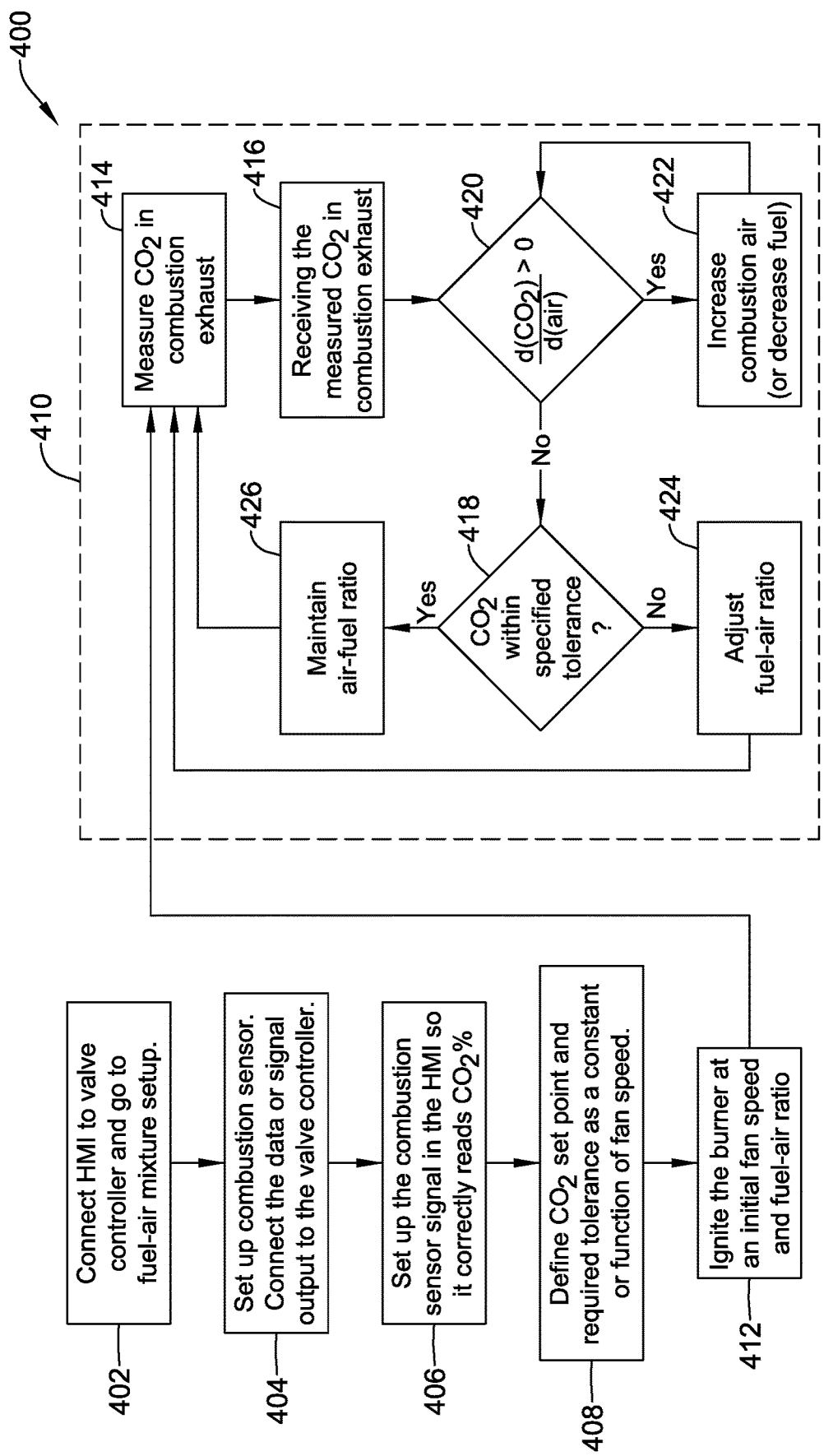
FIG. 13 is a schematic flow diagram depicting an illustrative closed-loop air-fuel ratio control procedure for a combustion appliance based on carbon dioxide content in an exhaust from a combustion appliance.
Figure 14:
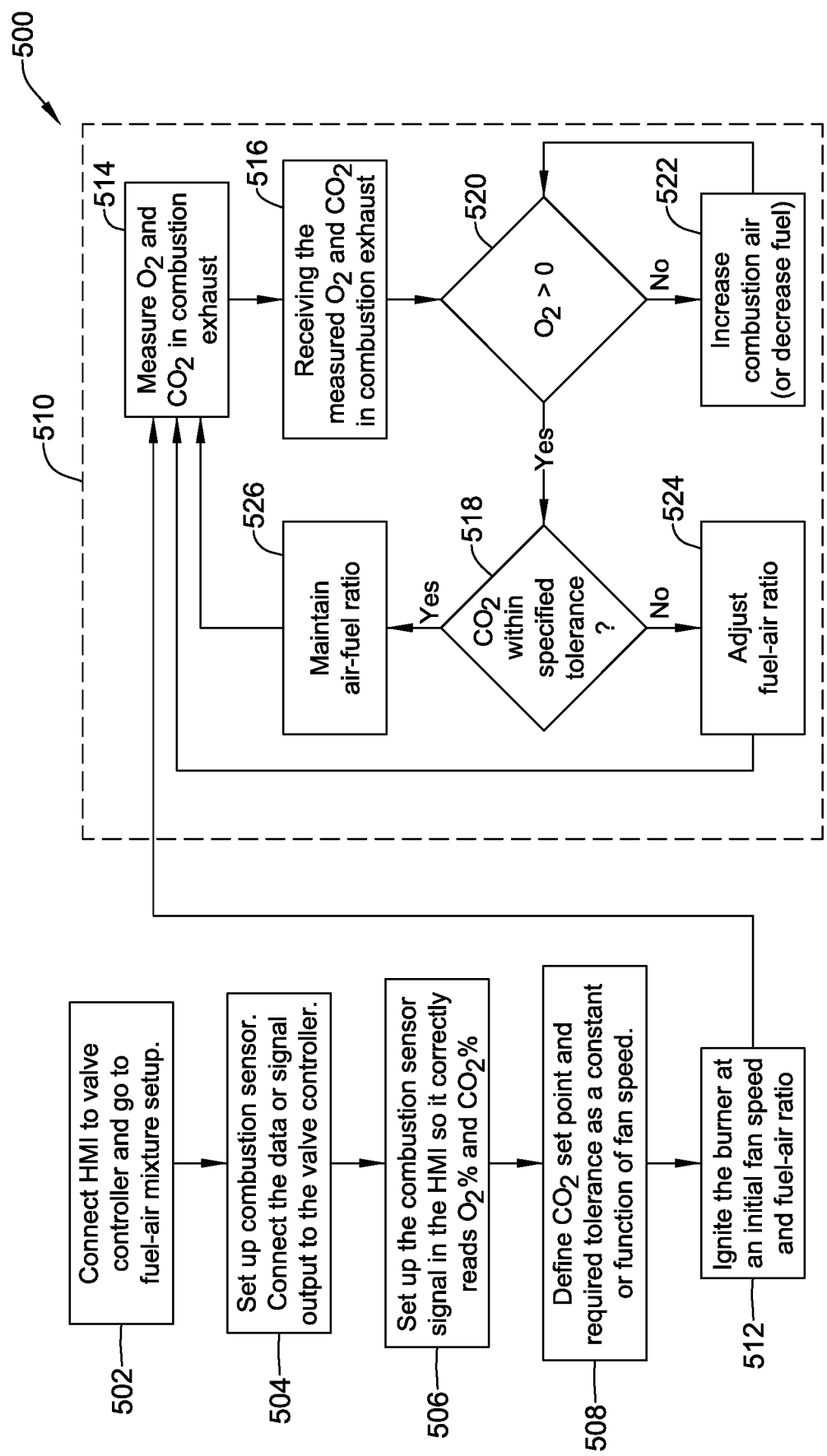
FIG. 14 is a schematic flow diagram depicting an illustrative closed-loop air-fuel ratio control procedure for a combustion appliance based on oxygen and carbon dioxide content in an exhaust from a combustion appliance.

FIGS. 12-14 depict flow diagrams of illustrative techniques for controlling a valve controller (e.g., the valve controller 26 or other suitable valve controller) in real-time based on feedback from a combustion sensor (e.g., the combustion sensor 13 or other suitable sensor). In some cases, an air-fuel ratio may be adjusted in response to a measurement of a combustion constituent sensed by the combustion sensor. Such control of the valve controller may account for local pressures, local temperatures, type of equipment, and/or other conditions, but this is not required.

At least some of the techniques depicted in FIGS. 12-14 may be automated using the valve controller and/or one or more other components of a burner control system (e.g., the burner control system 2 or other suitable burner control system). In some cases, the techniques of FIGS. 12-14 may utilize one or more components in communication with the valve controller. For example, a human-machine interface (HMI) (e.g., the HMI 23 or other suitable HMI) may be in communication with the valve controller and configured to interact with the valve controller to automatically control a valve position of a valve assembly (e.g., the gas valve assembly 10 or other suitable valve assembly) to adjust an air-fuel ratio of fluid flowing to a combustion chamber (e.g., the chamber 6 or other chamber) and maintain a measured combustion constituent within a tolerance relative to a set point. The HMI, when included, and the valve controller may be referred to as a controller herein even though the HMI and the valve controller may be configured as a single component or separate components.

The techniques of FIGS. 12-14 may utilize one or more sensors for sensing combustion constituents in an exhaust from the combustion chamber that are in communication with the valve controller. In some cases, the burner control system may include a combustion sensor and in other cases, the burner control system may not include a combustion sensor. When a combustion sensor is not included in the burner control system, a combustion sensor may be placed in the exhaust from the combustion chamber and communicatively connected to the valve controller and/or the HMI to provide measurements of the combustion constituents at each burner firing rate and/or each air-fuel ratio.

The control techniques depicted in FIGS. 12-14 may provide for automated closed-loop control of the fuel-air ratio. For example, each of the techniques may include determining or otherwise establishing an air-fuel ratio setting for a burner firing rate, receiving a measure of one or more combustion constituents exiting the combustion chamber at the air-fuel ratio setting, comparing the received measure of one or more combustion constituents and a set point for the one or more combustion constituents, controlling the air-fuel ratio based at least in part on the comparison between the received measure of one or more combustion constituents and the set point for the one or more combustion constituents.

FIG. 12 depicts an illustrative method 300 of closed loop burner system control to achieve an oxygen (e.g., a combustion constituent) set point in the exhaust from the combustion chamber. When an HMI is to be used in addition to the valve controller, the HMI may be connected 302 to the valve controller and the software of the HMI may proceed to an air-fuel ratio setup. The HMI may proceed to the air-fuel ratio setup automatically upon being connected to the valve controller and/or upon receiving user input.

A combustion sensor may be setup and connected 304 to the HMI and/or the valve controller. When the combustion sensor is not a permanent part of the burner control system or is not part of the burner control system at the time of set up (e.g., in a retro-fit application and/or other suitable applications), the combustion sensor may be attached to and/or placed in a flue extending from the combustion chamber and connected to or otherwise placed in communication with the HMI and/or the valve controller. Although the combustion sensor may be configured to sense an oxygen content in the flue, the combustion sensor may be configured to sense one or more other constituent contents in the flue. The combustion sensor may be a single sensor or multiple sensors.

Once the HMI and the combustion sensor are connected, as needed, the HMI and/or the valve controller may set up 306 the combustion sensor to ensure it is correctly measuring oxygen. In one example, the HMI and/or the valve controller may run a calibration procedure to ensure the combustion sensor is properly sensing oxygen. Although other calibration procedures may be utilized, one example calibration procedure may compare: (1) a measure of oxygen received from the combustion sensor when air is being blown through the combustion chamber while the combustion appliance is not firing; to (2) an expected oxygen content in air (e.g., 20.95% oxygen plus or minus a tolerance relative to the other constituents of air) and adjust a sensitivity and/or offset of the sensor, as needed. Such a calibration procedure may be repeated before and/or after each firing in the combustion chamber. Alternatively, the calibration procedure may occur upon receiving input from a user and/or at predetermined intervals.

An oxygen set point and associated tolerances, if any, for oxygen content in exhaust from a combustion chamber may be defined 308. The oxygen set point and associated tolerances for oxygen in the exhaust from the combustion chamber may be set by a user when setting up the HMI or valve controller and/or may be pre-determined by an original equipment manufacturer. In some cases, the oxygen set point may be associated with one or more safety regulations as the presence of oxygen in the exhaust may reduce an amount of carbon monoxide in the exhaust from the combustion chamber. Further, the oxygen set point may be a constant or may be set to be a function of a burner firing rate (e.g., the set point may be related to a fan speed of the combustion appliance). When the oxygen set point is a function of a burner firing rate, the HMI or valve controller may be configured to automatically change the oxygen set point in response to changes in the burner firing rate (e.g., in response to changes in fan speed of a fan blowing air through the combustion chamber).

An automated closed-loop control portion 310 of the method 300 may be initiated by igniting 312 a burner of a combustion appliance and the closed-loop control portion 310 may be repeated (e.g., continuously, at predetermined times, etc.) while the burner is firing. In some cases, the burner of the combustion appliance may be ignited at an initial fan speed and air-fuel ratio configured to achieve an oxygen set point for oxygen in the exhaust from the combustion chamber. The automated closed loop control portion 310 may include measuring 314 an oxygen content in exhaust from the combustion chamber with the combustion sensor, receiving 316 (e.g., via the input/output port 32 or other input/output interface) the measured oxygen in the combustion exhaust, and determining 318 whether the received measured oxygen in the combustion exhaust is within a specified or predetermined tolerance relative to the oxygen set point for oxygen in the combustion exhaust.

Determining 318 whether the received measured oxygen in the combustion exhaust is within a specified or predetermined tolerance may include comparing the received measure of oxygen in the combustion exhaust to the oxygen set point for oxygen in the combustion exhaust to determine a difference between the received measure of oxygen and the oxygen set point. Then, when the difference reaches or goes beyond a threshold amount (e.g., is beyond a tolerance), the HMI, valve controller, or other suitable controller of the burner control system may be configured to adjust 320 the air-fuel ratio and the steps 314-320 may be repeated until the received measured oxygen is within the predetermined tolerance. When the difference has not reached the threshold amount (e.g., is within a tolerance), the HMI, valve controller, or other suitable controller of the burner control system may be configured to maintain 322 the air-fuel ratio achieving the received measured oxygen and the steps 314-318 and 322 may be repeated until the received measured oxygen reaches or goes beyond the predetermined tolerance.

In addition to or as an alternative to following the steps 314-322 of the automated closed-loop control portion 310 of the method 300 to achieve an oxygen set point in the exhaust from the combustion chamber, a PID controller that implements a PID control algorithm may be utilized to perform the steps of adjusting an air-fuel ratio based on a measured oxygen (e.g., steps 318, 320, and 322) in the closed loop control portion 310 of the method 300. With such a PID controller, rather than determining if a measured oxygen is within a specified or predetermined tolerance, the closed loop control portion 310 may output one or more control signals that adjust the air-fuel ratio, where the one or more control signals may include a term that is proportional (P) to a difference between the measured oxygen and an oxygen set point, a term that represents an integral (I) of the difference between the measured oxygen and the oxygen set point, and a term that represents a derivative (D) of the difference between the measured oxygen and the oxygen set point.

FIG. 13 depicts an illustrative method 400 of closed loop burner system control to achieve a carbon dioxide (e.g., a combustion constituent) set point in the exhaust from the combustion chamber. When an HMI is to be used in addition to the valve controller, the HMI may be connected 402 to the valve controller and the software of the HMI may proceed to an air-fuel ratio setup. The HMI may proceed to the air-fuel ratio setup automatically upon being connected to the valve controller and/or upon receiving user input.

A combustion sensor may be setup and connected 404 to the HMI and/or the valve controller. When the combustion sensor is not a permanent part of the burner control system or is not part of the burner control system at the time of set up (e.g., in a retro-fit application and/or other suitable applications), the combustion sensor may be attached to and/or placed in a flue extending from the combustion chamber and connected to or otherwise placed in communication with the HMI and/or the valve controller. Although the combustion sensor may be configured to sense a carbon dioxide content in the flue, the combustion sensor may be configured to sense one or more other constituent contents in the flue. The combustion sensor may be a single sensor or multiple sensor.

Once the HMI and the combustion sensor are connected, as needed, the HMI and/or the valve controller may set up 406 the combustion sensor to ensure it is correctly measuring oxygen. In one example, the HMI and/or the valve controller may run a calibration procedure to ensure the combustion sensor is properly sensing carbon dioxide. Although other calibration procedures may be utilized, one example calibration procedure may compare: (1) a measure of carbon dioxide received from the combustion sensor when air is being blown through the combustion chamber and when the combustion appliance is not firing; to (2) an expected carbon dioxide content in air (e.g., 0.04% carbon dioxide plus or minus a tolerance relative to the other constituents of air) and adjust a sensitivity and/or offset of the sensor, as needed. Such a calibration procedure may be repeated before and/or after each firing in the combustion chamber. Alternatively, the calibration procedure may occur upon receiving input from a user and/or at predetermined intervals.

A carbon dioxide set point and associated tolerances, if any, for carbon dioxide content in exhaust from a combustion chamber may be defined 408. The carbon dioxide set point and associated tolerances for carbon dioxide in the exhaust from the combustion chamber may be set by a user when setting up the HMI or valve controller and/or may be pre-determined by an original equipment manufacturer. In some cases, the carbon dioxide set point may be associated with one or more safety regulations. Further, the carbon dioxide set point may be a constant or may be set to be a function of a burner firing rate (e.g., the set point may be related to a fan speed of the combustion appliance). When the carbon dioxide set point is a function of a burner firing rate, the HMI or valve controller may be configured to automatically change the carbon dioxide set point in response to changes in the burner firing rate (e.g., in response to changes in fan speed of a fan blowing air through the combustion chamber).

An automated closed-loop control portion 410 of the method 400 may be initiated by igniting 412 a burner of a combustion appliance and the closed-loop control portion 410 may be repeated (e.g., continuously, at predetermined times, etc.) while the burner is firing. In some cases, the burner of the combustion appliance may be ignited at an initial fan speed and an air-fuel ratio configured to achieve a carbon dioxide set point for carbon dioxide in the exhaust from the combustion chamber. The automated closed loop control portion 410 may include measuring 414 a carbon dioxide content in exhaust from the combustion chamber with the combustion sensor, receiving 416 (e.g., via the input/output port 32 or other input/output interface) the measured carbon dioxide in the combustion exhaust, and determining 418 whether the received measured carbon dioxide in the combustion exhaust is within a specified or predetermined tolerance relative to the carbon dioxide set point for carbon dioxide in the combustion exhaust.

As discussed above, when carbon dioxide measurements are graphed, a slope of the measured carbon dioxide may be indicative of whether carbon monoxide is present in the combustion exhaust. For example, if the slope of the measured carbon dioxide is positive, carbon monoxide may be present in the combustion exhaust and if the slope of the measured carbon monoxide is negative, carbon monoxide likely is not present or is diminishing in the combustion exhaust. As such, a slope of carbon monoxide relative to air may be compared 420 to a threshold value (e.g., zero or other suitable threshold value) and if the slope has not reached or gone beyond the threshold, an air-fuel ratio may be increased 422 by increasing a combustion air amount (e.g., increasing a fan speed) and/or by decreasing fuel (e.g., by closing a valve or reducing a valve opening) to a combustion chamber. When the slope of the measured carbon dioxide relative to air has reached or gone beyond the threshold value, it may be determined 418 whether the received measure of carbon dioxide is within the predetermined tolerance.

Determining 418 whether the received measured carbon dioxide in the combustion exhaust is within a specified or predetermined tolerance may include comparing the received measure of carbon dioxide in the combustion exhaust to the carbon dioxide set point for carbon dioxide in the combustion exhaust to determine a difference between the received measure of carbon dioxide and the carbon dioxide set point. Then, when the difference reaches or goes beyond a threshold amount (e.g., is beyond a tolerance), the HMI, valve controller, or other suitable controller of the burner control system may be configured to adjust 424 the air-fuel ratio and the steps 414-424 may be repeated until the received measured carbon dioxide is within the predetermined tolerance. When the difference has not reached the threshold amount (e.g., is within a tolerance), the HMI, valve controller, or other suitable controller of the burner control system may be configured to maintain 426 the air-fuel ratio achieving the received measured carbon dioxide and the steps 414-422 and 426 may be repeated until the received measured carbon dioxide reaches or goes beyond the predetermined tolerance.

In addition to or as an alternative to following the steps 414-426 of the automated closed-loop control portion 410 of the method 400 to achieve a carbon dioxide set point in the exhaust from the combustion chamber, a proportional-integral-derivative (PID) controller that implements a PID control algorithm may be utilized to perform the steps of adjusting an air-fuel ratio based on a measured carbon dioxide (e.g., steps 418, 424, and 426) in the closed loop control portion 410 of the method 400. With such a PID controller, rather than determining if a measured carbon dioxide is within a specified or predetermined tolerance, the closed loop control portion 410 may output one or more control signals that adjust the air-fuel ratio, where the one or more control signals may include a term that is proportional (P) to a difference between the measured carbon dioxide and a carbon dioxide set point, a term that represents an integral of the difference between the measured carbon dioxide and the carbon dioxide set point, and a term that represents a derivative of the difference between the measured carbon dioxide and the carbon dioxide set point.

FIG. 14 depicts an illustrative method 500 of closed loop burner system control to achieve a carbon dioxide (e.g., a combustion constituent) set point in the exhaust from the combustion chamber based on sensed carbon dioxide and sensed oxygen. When an HMI is to be used in addition to the valve controller, the HMI may be connected 502 to the valve controller and the software of the HMI may proceed to an air-fuel ratio setup. The HMI may proceed to the air-fuel ratio setup automatically upon being connected to the valve controller and/or upon receiving user input.

A combustion sensor may be setup and connected 504 to the HMI and/or the valve controller. When the combustion sensor is not a permanent part of the burner control system or is not part of the burner control system at the time of set up (e.g., in a retro-fit application and/or other suitable applications), the combustion sensor may be attached to and/or placed in a flue extending from the combustion chamber and connected to or otherwise placed in communication with the HMI and/or the valve controller. Although the combustion sensor may be configured to sense a carbon dioxide and oxygen content in the flue, the combustion sensor may be configured to sense one or more other constituent contents in the flue. The combustion sensor may be a single sensor or more multiple sensors. The combustion sensor may be a single sensor or multiple sensors.

Once the HMI and the combustion sensor are connected, as needed, the HMI and/or the valve controller may set up 506 the combustion sensor to ensure it is correctly measuring oxygen. In one example, the HMI and/or the valve controller may run a calibration procedure to ensure the combustion sensor is properly sensing carbon dioxide and oxygen. Although other calibration procedures may be utilized, one example calibration procedure may compare: (1) a measure of carbon dioxide and a measure of oxygen both received from the combustion sensor when air is being blown through the combustion chamber while the combustion appliance is not firing; to (2) an expected carbon dioxide content in air and an expected oxygen content in air (e.g., 0.04% carbon dioxide plus or minus a tolerance relative to the other constituents of air and 20.95% oxygen plus or minus a tolerance relative to the other constituents of air) and adjust a sensitivity and/or an offset of the sensor, as needed. Such a calibration procedure may be repeated before and/or after each firing in the combustion chamber. Alternatively, the calibration procedure may occur upon receiving input from a user and/or at predetermined intervals.

A carbon dioxide set point and associated tolerances, if any, for combustion constituents in the exhaust from a combustion chamber may be defined 508. The carbon dioxide set point and associated tolerances for combustion constituents in the exhaust from the combustion chamber may be set by a user when setting up the HMI or valve controller and/or may be pre-determined by an original equipment manufacturer. In some cases, the carbon dioxide set point may be associated with one or more safety regulations. Further, the carbon dioxide set point may be a constant or may be set to be a function of a burner firing rate (e.g., the set point may be related to a fan speed of the combustion appliance). When the carbon dioxide set point is a function of a burner firing rate, the HMI or valve controller may be configured to automatically change the carbon dioxide set point in response to changes in the burner firing rate (e.g., in response to changes in fan speed of a fan blowing air through the combustion chamber).

An automated closed-loop control portion 510 of the method 500 may be initiated by igniting 512 a burner of a combustion appliance and the closed-loop control portion 510 may be repeated (e.g., continuously, at predetermined times, etc.) while the burner is firing. In some cases, the burner of the combustion appliance may be ignited at an initial fan speed and an air-fuel ratio configured to achieve a carbon dioxide set point for carbon dioxide in the exhaust from the combustion chamber. The automated closed loop control portion 510 may include measuring 514 a carbon dioxide content in exhaust from the combustion chamber with the combustion sensor, receiving 516 (e.g., via the input/output port 32 or other input/output interface) the measured carbon dioxide in the combustion exhaust, and determining 518 whether the received measured carbon dioxide in the combustion exhaust is within a specified or predetermined tolerance relative to the carbon dioxide set point for carbon dioxide in the combustion exhaust.

As discussed above, a presence of oxygen in the combustion exhaust is indicative of no carbon monoxide or an acceptable amount of carbon monoxide in the combustion exhaust. As such, the HMI or valve controller may be configured to determine 520 whether an oxygen content in the combustion exhaust is greater than zero (0) or other suitable threshold. If the oxygen content of the exhaust is not above zero or other suitable threshold, the air-fuel ratio may be adjusted 522 by increasing a ratio of air to fuel in the flow of fluid to the combustion chamber via increasing a combustion air amount (e.g., increasing a fan speed) and/or by decreasing fuel (e.g., by closing a valve or reducing a valve opening) to a combustion chamber and it may be further determined 520 whether an oxygen content in the exhaust from the combustion chamber is greater than zero or other suitable threshold. This process may be repeated until the oxygen content in the exhaust is greater than zero or other suitable threshold. Once the oxygen content of the exhaust has been determined to exceed zero or go beyond one or more other suitable thresholds, it may be determined 518 whether the received measure of carbon dioxide is within the predetermined tolerance.

Determining 518 whether the received measured carbon dioxide in the combustion exhaust is within a specified or predetermined tolerance may include comparing the received measure of carbon dioxide in the combustion exhaust to the carbon dioxide set point for carbon dioxide in the combustion exhaust to determine a difference between the received measure of carbon dioxide and the carbon dioxide set point. Then, when the difference reaches or goes beyond a threshold amount (e.g., is beyond a tolerance), the HMI, valve controller, or other suitable controller of the burner control system may be configured to adjust 524 the air-fuel ratio and the steps 514-524 may be repeated until the received measured carbon dioxide is within the predetermined tolerance. When the difference has not reached the threshold amount (e.g., is within a tolerance), the HMI, valve controller, or other suitable controller of the burner control system may be configured to maintain 526 the air-fuel ratio achieving the received measured oxygen and the steps 514-522 and 526 may be repeated until the received measured oxygen reaches or goes beyond the predetermined tolerance.

In addition to or as an alternative to following the steps 514-526 of the automated closed-loop control portion 510 of the method 500 to achieve a carbon dioxide set point in the exhaust from the combustion chamber based on sensed carbon dioxide and sensed oxygen, a proportional-integral-derivative (PID) controller that implements a PID control algorithm may be utilized to perform the steps of adjusting an air-fuel ratio based on a measured carbon dioxide (e.g., steps 518, 524, and 526) in the closed loop control portion 510 of the method 500. With such a PID controller, rather than determining if a measured carbon dioxide is within a specified or predetermined tolerance, the closed loop control portion 510 may output one or more control signals that adjust the air-fuel ratio, where the one or more control signals include a term that is proportional to a difference between the measured carbon dioxide and a carbon dioxide set point, a term that is related to an integral of the difference between the measured carbon dioxide and the carbon dioxide set point, and a term that is related to a derivative of the difference between the measured carbon dioxide and the carbon dioxide set point.

It should be understood that this disclosure is, in many respects, only illustrative. The various individual elements discussed above may be arranged or configured in any combination thereof without exceeding the scope of the disclosure. Changes may be made in details, particularly in matters of shape, size, and arrangement of steps without exceeding the scope of the disclosure. The disclosure's scope is, of course, defined in the language in which the appended claims are expressed.

What is claimed is:

1. An auto-programming control system for a combustion burner having a gas valve assembly and/or a fan that is controllable to provide a plurality of burner firing rates of the combustion burner, comprising:
 a controller configured to control an air-fuel ratio of a fluid flow to the combustion burner by controlling the gas valve assembly to control an amount of fuel that is provided to the combustion burner and/or controlling a fan speed of the fan to control an amount of air that is provided to the combustion burner;
 a memory in communication with the controller; and
 wherein the controller is configured to control the gas valve assembly of the combustion burner to fire the combustion burner at each of the plurality of burner firing rates, and at each of the plurality of burner firing rates the controller is configured to:
 set an initial air-fuel ratio setting;
 receive from one or more combustion sensors a measure of a combustion constituent exiting a combustion chamber of the combustion burner at the initial air-fuel ratio setting;
 determine a difference between the measure of the combustion constituent exiting the combustion chamber and a combustion constituent set point;
 adjust the air-fuel ratio setting until the difference between the measure of the combustion constituent exiting the combustion chamber and the combustion constituent set point is below a threshold, and then save to the memory the adjusted air fuel ratio setting and an association between the adjusted air-fuel ratio setting and the corresponding one of the plurality of burner firing rates; and
 move to a next burner firing rate of the plurality of burner firing rates and repeat.

2. The auto-programming control system of claim 1, wherein adjusting the air-fuel setting comprises adjusting a valve position of the gas valve assembly, and wherein saving the association between the adjusted air fuel ratio setting and the corresponding one of the plurality of burner firing rates comprises saving an association between the valve position and the corresponding one of the plurality of burner firing rates.

3. The auto-programming control system of claim 1, wherein adjusting the air-fuel ratio setting comprises adjusting the fan speed of the fan to control the amount of air that is provided to the combustion burner, and wherein saving the association between the adjusted air-fuel ratio setting and the corresponding one of the plurality of burner firing rates comprises saving an association between the fan speed and the corresponding one of the plurality of burner firing rates.

4. The auto-programming control system of claim 3, further comprising:
 a user interface in communication with the controller; and
 wherein the controller is configured to identify a set of burner firing rates based on a user selection made via the user interface.

5. The auto-programming control system of claim 1, wherein the measure of the combustion constituent comprises an oxygen concentration and/or a carbon dioxide concentration.

* * * * *